United States Patent [19]

Takemoto et al.

[11] Patent Number: 5,571,763
[45] Date of Patent: Nov. 5, 1996

[54] EXHAUST GAS PURIFICATION SYSTEM AND CATALYST THEREFOR

[75] Inventors: Takashi Takemoto, Higashihiroshima; Yasuto Watanabe, Iwakuni; Akihide Takami, Hiroshima; Hideharu Iwakuni, Hiroshima; Makoto Kyogoku, Hiroshima; Kazunari Komatsu, Mihara, all of Japan

[73] Assignee: Mazda Motor Corporation, Hiroshima-ken, Japan

[21] Appl. No.: 71,020

[22] Filed: Jun. 2, 1993

[30] Foreign Application Priority Data

Jun. 2, 1992 [JP] Japan .................................. 4-141508
Sep. 29, 1992 [JP] Japan .................................. 4-259265
May 28, 1993 [JP] Japan .................................. 5-126552

[51] Int. Cl.$^6$ .............................. B01J 23/40; B01J 23/42
[52] U.S. Cl. ......................... 502/334; 502/261; 502/262; 502/263; 502/332; 502/339; 502/304; 502/354; 423/213.5
[58] Field of Search ............................ 502/66, 74, 261, 502/262, 263, 332, 304, 339, 354; 423/213.5

[56] References Cited

U.S. PATENT DOCUMENTS

| 3,686,340 | 8/1972 | Patrick et al. | 502/304 |
| 3,700,745 | 10/1972 | Kovach et al. | 502/304 |
| 3,770,616 | 11/1973 | Kominami et al. | 502/330 |
| 3,929,619 | 12/1975 | Sinfelt et al. | 502/74 |
| 4,111,848 | 7/1978 | Torii et al. | 423/213.5 |
| 4,171,287 | 10/1979 | Keith | 423/213.5 |
| 5,157,007 | 10/1992 | Domesle et al. | 502/66 |
| 5,164,350 | 11/1992 | Abe et al. | 502/74 |

FOREIGN PATENT DOCUMENTS 3-202157  9/1991  Japan .

*Primary Examiner*—Anthony McFarlane
*Attorney, Agent, or Firm*—Keck, Mahin & Cate

[57] ABSTRACT

An engine exhaust gas purifying catalyst contains, as active substances, platinum and at least one of iridium, III-B metals and IV-B metals. In particular, the catalyst contains mainly platinum and iridium and, desirably, rhodium as an additive catalyst substance.

9 Claims, 10 Drawing Sheets

EXHAUST GAS PURIFICATION SYSTEM AND CATALYST THEREFOR

BACKGROUND OF THE INVENTION

1. Field of the Invention

This invention relates to an exhaust gas purifying catalyst.

2. Description of Related Art

Three-way types of catalytic convertors are devices installed in an engine exhaust line to significantly lower emission levels of carbon monoxide (CO), hydrocarbons (HC) and nitrogen oxides (NOx). This in turn causes carbon monoxide (CO) and hydrocarbons (HC) to change into water vapor ($H_2O$) and carbon dioxide ($CO_2$) by means of an oxidizing process. On the other hand, it changes nitrogen oxides (NOx) into nitrogen ($N_2$) and oxygen ($O_2$) by means of a deoxidizing or contact cracking process. A most popular three-way type catalytic converter uses platinum (Pt), palladium (Pd) and rhodium (Rh) as a catalyst material which is carried by G-aluminum. Such a three-way catalytic converter causes an increase in the rate of a chemical reaction or exhaust gas burning for air-to-fuel (A/F) ratios near a theoretical air-to-fuel (A/F) ratio of 14.7.

Emissions, especially nitrogen oxides (NOx), can pose a health problem for human bodies and ecological systems if uncontrolled. For this reason, engines must be equipped with devices to lower emission levels of nitrogen oxides (NOx) as low as possible. For vehicle engines, it is practical to equip a catalytic converter and an emission control by placing same in the exhaust system between the exhaust manifold and muffler. On the other hand, in order to meet exhaust gas regulations and fuel consumption regulations, what are called "lean-burn engines" are already put to practical use. Because such a lean-burn engine burns a lean fuel mixture which, in turn, is generally at a high air-to-fuel ratio and, consequently, discharges exhaust at a high concentration of oxygen ($O_2$), although the three-way catalytic converter causes the oxidization of carbon monoxide (CO) and hydrocarbons (HC), it can not deoxidize nitrogen oxides (NOx), so that it is difficult to reduce emission levels of nitrogen oxides (NOx).

From this technical background, one of the promising and attractive catalysts is a zeolite type catalyst, which bears a transition metal carried by means of ion-exchange, to catalytically crack or change nitrogen oxides into nitrogen ($N_2$) and oxygen ($O_2$) either directly or by the aid of catalytic agents, such as carbon monoxide (CO) and hydrocarbons (HC), even if the exhaust gas is at a high concentration of oxygen. Efforts are focused on various improvements of such an ion-exchanged transition metal carrying zeolite catalyst so that it can reduce nitrogen oxides (NOx) in a high rate and to cause an increase in the rate of chemical reaction. For example, a zeolite catalyst can be improved in the rate of nitrogen oxides (NOx) purification and in durability by carrying therein copper (Cu), at least one of alkaline-earth metals and at least one of rear-earth metals. Such a zeolite catalyst is known from, for example, Japanese Unexamined Patent Publication No. 3 (1991) - 202157.

In general, Cu ion-exchanged zeolite type catalysts can effectively reduce emission levels of nitrogen oxides (NOx), and exhibit, on an experimental basis, a rate of nitrogen oxides (NOx) reduction higher than 90%. However, when such a Cu ion-exchanged zeolite type catalyst is utilized as a practical catalytic converter in lean-burn engine mounted vehicles, it causes a great decrease in the rate of nitrogen oxides (NOx) reduction. This, on one hand, is considered to result from the difference in conditions between a model gas used in experiments and an exhaust gas actually discharged from such a lean-burn engine. Nitrogen oxides (NOx) have a great tendency to be in the form of nitrogen dioxide ($NO_2$) when the exhaust gas is at high concentrations of oxygen and at temperatures lower than 200° C. The Cu ion-exchanged zeolite type catalyst is inactive on nitrogen oxides (NOx) at temperatures lower than 200° C. However, temperatures at which a nitrogen oxides (NOx) reduction activity is actualized are within a temperature range of 350° to 450° C. Also, the Cu ion-exchanged zeolite type catalyst is evaluated to be lower in the rate of nitrogen oxides (NOx) reduction for the engine exhaust gas at high oxygen concentrations. Further, because, in particular, the exhaust gas, discharged from an engine being operated under lower loads, is lower in gas temperature at the entrance of a catalytic converter, it is also essential for the Cu ion-exchanged zeolite type catalyst to be active in chemical reaction over a wide range of temperatures including lower temperature.

SUMMARY OF THE INVENTION

It is therefore an object of the present invention to provide a catalyst which can cause an increase in the rate of nitrogen oxides (NOx) reaction, even when an exhaust gas is at high oxygen concentrations and is at high temperatures just before the catalyst.

It is another object of the present invention to provide a catalyst which is improved in catalytic activity in a wide range of temperatures and has great heat-resistance.

The above objects of the present invention are achieved by providing a noble catalyst material for purifying of engine exhaust gas, which includes a noble metal, having an excellent catalytic reaction in a lower range of temperatures, and a metal element, being able to interact on the noble metal and which is carried by means of, for instance, a zeolite carrier material. The catalyst material, thus composed, is active in a wide range of temperatures from low to high to exhibit improved nitrogen oxides (NOx) reduction rates and improved heat-resistance. Specifically, the engine exhaust gas purifying catalyst material includes platinum (Pt) catalyst substance and iridium (Ir) catalyst substance carried by a catalyst carrier, such as zeolite, such as a metal contained silicate. The metals of platinum family, such as platinum (Pt), palladium (Pd), rhodium (Rh), iridium (Ir), osmium (Os) and Ruthenium (Ru), have oxidation powers per unit weight listed in Table I and stand in this order. Rhodium (Rh) and iridium (Ir) tend to exhibit their oxidation power at higher temperatures than platinum (Pt) and palladium (Pd).

TABLE I

| Catalyst Substance | Content in Catalyst (g/liter) | Temperature (°C.) | Oxidization Power (%) |
|---|---|---|---|
| Platinum (Pt) | 1 | 350 | 71.8 |
| Palladium (Pd) | 1 | 350 | 69.1 |
| Rhodium (Rh) | 1 | 350 | 14.5 |
| Iridium (Ir) | 1 | 350 | 13.5 |
| Ruthenium (Ru) | 1 | 350 | 8.9 |

It was recognized that the effectiveness of platinum (Pt) in low temperature activity of the catalyst material was attributable to the oxidization power thereof. The present inventors, who noticed this fact, conducted various investigations seeking knowledge about the peculiar behavior of each catalyst substance of a two component catalyst material exhibited during catalytic reaction and the fact about what interactions a two component catalyst material would experience.

As a consequence of these investigations, it was revealed that, although iridium (Ir) itself had a nitrogen oxide (NOx) reduction power less than platinum (Pt), a Pt—It component catalyst material expanded the range of reaction temperatures toward the lower side at high oxygen concentrations, which was considered to be attributable to an interaction between the two components and that carrying platinum (Pt) and iridium (Ir) close to each other in a substrate caused an enhanced increase in the rate of exhaust gas reduction, when the two component catalyst material was still fresh.

Regarding interaction between platinum (Pt) and iridium (Ir), it is postulated, on the basis of the fact that platinum (Pt) is affluent in oxidization power and iridium (Ir) is strong in adsorbing power of nitrogen oxides (NOx), that hydrocarbons (HC), having been oxidized and activated by platinum (Pt), effectively attacked nitrogen oxides (NOx) captured by iridium (Ir) particles so as to crack or change them into nitrogen ($N_2$) and oxygen ($O_2$), or that platinum (Pt) and iridium (Ir) had distinctive roles in nitrogen oxides (NOx) reduction activities to crack or change nitrogen oxides (NOx) with efficiency. Further, it was revealed that, though hydrocarbons (HC) and carbon monoxide (CO) were oxidized by platinum (Pt) and consequently, acted as deoxidization agents on nitrogen oxides (NOx), and though iridium (Ir) was affluent in the power of reducing nitrogen oxides (NOx), other hydrocarbons (HC) and carbon monoxide (CO), which had not been involved in the reduction or deoxidization of nitrogen oxides (NOx), were oxidized with iridium (Ir) located closely to platinum (Pt). It was understood that, by means of this oxidization of hydrocarbons (HC) and carbon monoxide (CO) with iridium (Ir), oxygen ($O_2$), which had been produced through the reduction of nitrogen oxides (NOx) and adsorbed by the platinum (Pt), was removed, so as to keep the activity of the platinum (Pt) and as a result, the Pt—Ir catalyst material was endowed by the removal of oxygen ($O_2$) from platinum (Pt) with efficient and positive activity in a range of lower temperatures.

It is also considered to be another interaction between platinum (Pt) and iridium (Ir) that the coexistent platinum (Pt) and iridium (Ir), which had an oxidization power less than platinum (Pt), subdued or restricted platinum (Pt) to act with a high oxidization power, or in other words, diluted the oxidization power of platinum (Pt), and consequently, rendered platinum (Pt) easy to produce intermediate products of burned hydrocarbons (HC), or what was the result of the oxidization of hydrocarbons (HC), during a nitrogen oxides (NOx) reduction. It was understood that these interactions endowed the Pt—Ir catalyst material with efficient and positive activity in a range of lower temperatures.

According to experiments, it was revealed that, Pt—Ir component catalyst materials were required to have platinum (Pt)-to-iridium (Ir) ratios between 1:0 and 1:3 in order to exhibit maximum rates of nitrogen oxides (NOx) reduction of at least approximately 34% which was desirable for effective catalytic activities, and platinum (Pt)-to-iridium (Ir) ratios between 6:1 and 1:1 in order to exhibit maximum rates of nitrogen oxides (NOx) reduction of approximately 50% or higher. Accordingly, it was understood that the platinum (Pt)-to-iridium (Ir) ratio should be determined to be within the above-described ratios.

Next, regarding an interaction between platinum (Pt) and one of III-B metals and IV-B metals, investigations were conducted seeking metals which was able to improve the power of nitrogen oxides (NOx) reduction. The investigations revealed that, though any III-B or IV-B metals were almost inactive in nitrogen oxides (NOx) reduction at high oxygen concentrations, they exhibited a promising interaction with platinum (Pt) and were recognized to function as a catalytic activity enhancement. It was considered to be one of catalytic activity enhancement effects of such III-B and IV-B metals that, by means of the coexistence of any III-B or IV-B metal with platinum (Pt) in the form of an oxide, it made platinum less strong in oxidization power so as to render it easy to produce intermediate products of burned hydrocarbons (HC) which were helpful to nitrogen oxides (NOx) reduction.

It was considered to be another effect that any III-B or IV-B metal reacted with oxygen ($O_2$), which had been produced during the reduction of nitrogen oxides (NOx) and adsorbed by the Pt—Ir component catalyst material, i.e. it functioned as a storage substance of oxygen ($O_2$) so as to keep platinum (Pt) active. For such a catalytic activity enhancement, gallium (Ga) and indium (In) of III-B metals and tin (Sn) of IV-B metals are preferably utilized.

According to experiments, it was revealed that, Pt—Sn component catalyst materials were required to have platinum (Pt)-to-tin (Sn) ratios lower than 1:2 in order to exhibit maximum rates of nitrogen oxides (NOx) reduction of at least approximately 34% which was desirable for effective catalytic activities, and platinum (Pt)-to-tin (Sn) ratios between 4:1 and 1:1 in order to exhibit maximum rates of nitrogen oxides (NOx) reduction of approximately 50% or higher. It was understood that proportions or ratios of catalyst substance components, such as platinum (Pt) and gallium (Ga), platinum (Pt) and indium (In), platinum (Pt) and cerium (Ce), and platinum (Pt) and antimony (Sb), should be intended to be within the ranges mentioned above for excellent rates of nitrogen oxides (NOx) reduction.

Behaviors were indistinguishable between carrier materials such as crystalline carriers, for instance metal containing silicate, and amorphous carriers, for carrying these various catalyst materials. It was recognized that titanium dioxide ($TiO_2$), diatomaceous earth, etc. were usable as carrier materials and that carrier materials were not restricted to metal containing silicates.

Monolith types of catalyst converters are made by washcoating the catalyst materials, including platinum and at least one other catalyst substance, mixed with inorganic binders, such as 20 weight percent of hydrated aluminum, 20 weight percent of silica sol, and the like, on a codeweylite catalyst bed. Coating processes, such as an impregnating process, a coprecipitating process, an evaporating and drying solidification process, a spray drying process, rather than an ion-exchanging process, are preferred to coat catalyst materials on catalyst beds. This is because the ion-exchange process is restricted to a smaller amount of catalyst material per unit area than the other processes.

From a result of the various investigations conducted by the inventors, platinum (Pt) and iridium (Ir) was endorsed as a favorable combination to cause an increase in the rate of nitrogen oxides (NOx) reduction and an improvement of activity at lower temperatures. Further, rhodium (Rh) was also endorsed an additive catalyst substance to improve heat-resistance of a Pt—Ir component catalyst material. Platinum (Pt) and iridium (Ir) particles tend to sinter when being exposed to high temperatures. In this instance, these catalyst substances, on one hand, become considerably declined in selective reaction to nitrogen oxides (NOx) as compared with hydrocarbons (HC) and/or carbon monoxide (CO) and, on the other hand, alter the burning form of hydrocarbons (HC). Consequently, a Pt—Ir component catalyst material produces intermediate products of burned hydrocarbons (HC) before and after aging, so as to impede efficient progress of a nitrogen oxides (NOx) reduction. However, iridium (Ir) tends to mitigate the sintering effect of the catalyst material so as to increase the heat-resistance of the catalyst material and render it active at high temperatures.

An activation site wherein a catalytic reaction is performed is formed by means of the coexistence of Iridium (Ir) dispersed closely to platinum (Pt), and is controlled or diluted in oxidization by iridium (Ir). It was considered that the production of a great deal of intermediate products, which are favorable to nitrogen oxides (NOx) reduction, was attributable to this dilution of oxidization.

A Pt-Ir-Rh component catalyst material is composed of platinum (Pt) of 55 to 90%, iridium (Ir) of less than 50% and rhodium (Rh) of less than 15% in weight proportions, with respect to the total weight of the catalyst material. As a result of experiments, the Pt—Ir—Rh component catalyst material exhibited the rate of nitrogen oxides (NOx) reduction higher than 20% even after aging.

The Pt—Ir—Rh component catalyst material may be composed of platinum (Pt) of 74 to 90%, iridium (Ir) of 7 to 23% and rhodium (Rh) of 2.5 to 8%, in weight proportions, with respect to the total weight of the catalyst material. This Pt—Ir—Rh component catalyst material causes an increase in the rate of nitrogen oxides (NOx) reduction not only before aging but also after being exposed to high temperatures of heat or after aging.

When platinum (Pt), iridium (Ir) and rhodium (Rh) substances are carried with the Pt—Ir—Rh component catalyst material by means of evaporating and drying solidification, a desired proportions are 80 to 90%, 7 to 15% and 3 to 8% in weight for platinum (Pt), iridium (Ir) and rhodium (Rh), respectively. According to this proportions, the Pt—Ir—Rh component catalyst material exhibits a high rate of nitrogen oxides (NOx) reduction, for instance higher than 25% even after aging, with an increase in nitrogen oxides (NOx) reduction, for instance, higher than 55% before aging.

When platinum (Pt), iridium (Ir) and rhodium (Rh) substances are carried with the Pt—Ir—Rh component catalyst material by means of spray drying, a desired proportions are 74 to 86%, 11 to 23% and 2.5 to 8% in weight for platinum (Pt), iridium (Ir) and rhodium (Rh), respectively. According to this proportions, the Pt—Ir—Rh component catalyst material exhibits a high rate of nitrogen oxides (NOx) reduction, for instance higher than 25% even after aging, with an increase in nitrogen oxides (NOx) reduction, for instance, higher than 55% before aging.

An additive catalyst substance, such as indium (In), cerium (Ce) and antimony (Sb), is within 0.5 to 5% in weight relative to rhodium (Rh). In general, nitrogen oxides (NOx) reduction changes in rate depend upon gas temperatures and is actually caused around 250° C., which is a starting temperature for producing of intermediate products of burned hydrocarbons (HC), before a catalyst material is heated to 450° C.

The inventors, who had noticed such a property of such a catalyst material, conducted various investigations seeking knowledge about metals which could lower the dependency in nitrogen oxides (NOx) reduction rate of Pt—Ir—Rh component catalyst materials upon temperatures. As a result of the investigations, it was recognized that either one of indium (In), which is one of the III-B metals, cerium (Ce), which is one of the rare-earth elements, and antimony (Sb), which is one of IV-B metals, was useful as an additive catalyst substance for controlling of the temperature dependency in nitrogen oxides (NOx) reduction of Pt—Ir—Rh catalyst materials. In this instance, the catalyst substance, namely indium (In), cerium (Ce) or antimony (Sb), controls the tendency of easy reaction to hydrocarbons (HC), rather than to nitrogen oxides (NOx), at high exhaust gas temperatures. That is, perfect burning of hydrocarbons (HC) alone is controlled and intermediate products of burned hydrocarbons (HC) are easily produced, attributable to which nitrogen oxides (NOx) reduction efficiently proceeds. Further, the additive catalyst substance, namely indium (In), cerium (Ce) or antimony (Sb) prevents sintering of noble metal catalyst substances so as to improve heat-resistance of the catalyst material.

Thanks to the additive catalyst substance, the Pt—Ir—Rh component catalyst material is prevented from lowering considerably its nitrogen oxides (NOx) reduction power in a range of higher temperatures and cause an increase in the rate of nitrogen oxides (NOx) reduction 10% higher than when it is not added with any additive catalyst substance. In other words, although the respective additive catalyst substance, namely indium (In), cerium (Ce) or antimony (Sb), is impossible to form an active site, it dilutes the power of oxidization of platinum (Pt) and endows platinum (Pt) and iridium (Ir) with activity, so that the Pt—Ir—Rh component catalyst material is highly active even in a wide range of higher temperatures. In this instance, while the Pt—Ir—Rh component catalyst material is still fresh, it is not affected in maximum nitrogen oxides (NOx) reduction rate by the respective additive catalyst substance and sometimes causes a slight decrease in the rate. Such a decrease is, however, controlled by quantitatively adjusting the additive catalyst substance. Even though there is a slight decrease in the rate due to the additive catalyst substance, it does not adversely affect the maximum nitrogen oxides (NOx) rate of the Pt—Ir—Rh component catalyst material, and prevents the Pt—Ir—Rh component catalyst material from causing a decrease in the rate of nitrogen oxides (NOx) reduction, thereby obtaining a high value.

An additive catalyst substance, such as indium (In), cerium (Ce) and antimony (Sb), is within 0.5 to 1.5% in weight relative to rhodium (Rh). This proportions are suitable for an increase in the maximum rate of nitrogen oxides (NOx) reduction after aging.

The catalyst carrier material may be metal contained or containing silicate, such as aluminum silicate or zeolite. If preferable, the aluminum silicate may contain any one of gallium (Ga), cerium (Ce) manganese (Mn) and terbium (Tb) in place of, or otherwise together with, aluminum (Al). It is preferred to use A-type, X-type, Y-type, moldenite, ZSM-5, and so forth. In particular, an Na-type ZSM-5, having sodium (Na) as a cation element, or an H-type ZSM-5, having hydrogen ($H^+$) as a cation element, are favorably used.

Catalyst substances, such as platinum (Pt) and iridium (Ir), may partly be dispersed in a catalyst carrier material and partly in a binder. The catalyst material, whose catalyst substances are partly dispersed in the binder, can improve the dispersion of catalyst substances. Such a catalyst material renders the catalyst substances easy to contact with exhaust gases so as to improve the dispersion of nitrogen oxides (NOx) reduction to space velocities of the exhaust gases. Typically, a binder is used as 20% of a catalyst carrier material, such as metal contained silicate. By carrying a part of catalyst substances in the binder and another part of the catalyst substances in the catalyst material, the dispersion of the catalyst substances is improved with neither increases nor decreases in the total quantity of the catalyst substances.

It is known that a catalyst material changes its nitrogen oxides (NOx) reduction rate depending upon exhaust gas speeds or space velocities i.e. as the exhaust gas space velocity increases, the catalyst material causes a greater change in nitrogen oxides (NOx) reduction rate. That is, the catalyst material has the dependency of nitrogen oxides (NOx) reduction rate to exhaust gas space velocities.

Contrary, the catalyst material of the present invention, which has been improved in the dispersion of catalyst material substances, causes an improvement in the dependency of nitrogen oxides (NOx) reduction rate to exhaust gas space velocities. However, because binders are less as compared with metal contained silicates, if the catalyst substances are dispersed in excess in a binder, the catalyst material lowers its nitrogen oxides (NOx) reduction rate before aging. Catalyst substances, when carried in oxides, such as a binder, cause a decrease in catalytic activity as compared with when carried in metal contained silicates.

Accordingly, when taking account of characteristics of the metal contained silicate mentioned above that it has an acid point and that catalyst substances, such as platinum (Pt) and iridium (Ir), contained in the metal contained silicate form an activity site, it is appropriate to contain or include catalyst substances 2 to 20%, more preferably 5 to 10%, in weight of their total quantity in the binder.

BRIEF DESCRIPTION OF THE DRAWINGS

The above and other objects and features of the present invention will be fully and clearly understood from the following detailed description with respect to a preferred embodiment thereof when considered in conjunction with the accompanying drawings, in which.

DETAILED DESCRIPTION OF THE PREFERRED EMBODIMENT

It is noted that the term "aging" used in the specification means and refers to a process of heating a catalyst material in the air at approximately 800° C. for 8 hours.

Catalyst materials in accordance with preferred embodiments of the present invention will be hereafter described by way example.

EMBODIMENT (EXAMPLE) I

In order to examine the exhaust gas purifying catalyst, containing 3 g of platinum (Pt) and iridium (Ir) catalyst substances in accordance with a preferred embodiment of the invention, a catalyst material "A" was prepared, contain 0.4852 g of divalent platinum amine (Pt: 57.7% or 0.28 g) and 0.1392 of iridium trichloride ($IrCl_3$) (Ir: 64.7% or 0.09 g) as a Pt—Ir catalyst substance. These divalent platinum amine and iridium trichloride ($IrCl_3$) catalyst substances were dispersed first in water and ethanol, respectively, and then mixed with 15 g of an Na-type ZSM-5, as a catalyst carrier material, which was one of metal contained silicate. The Pt—Ir catalyst material "A," thus prepared, was heated to approximately 50° C. and, after being agitated, dried and solidified. It was further dried at 150° C. for three hours in the air and subsequently baked at 500° C. for two hours in the air. The Pt—Ir Na-type ZSM-5 catalyst material "A" of 3 g was coated to a codeweylite catalyst bed by wash coating well known in the art to provide a test sample of the Pt—Ir Na-type ZSM-5 catalyst material "A". The test sample was further backed at 150° C. for three hours and then backed at 500° C. for two hours.

Measurements were conducted for the test sample of the Pt—Ir Na-type ZSM-5 catalyst material "A to measure maximum rates of a nitrogen oxides (NOx) reduction for various Pt-to-Ir ratios, The measurements were carried by the use of a stable gas pressure-stationary reactor. A model gas at a high concentration of oxygen, approximated to an exhaust gas generated when a lean fuel of an air-to-fuel ratio of approximately 22 was burned, was passed at a space velocity (SV) of 55,000 $h^{-1}$ through the fresh test sample of the Pt—Ir Na-type ZSM-5 catalytic material "A" to measure the maximum rate of nitrogen oxides (NOx) reduction. The results are shown in Table II and in FIG. 1.

TABLE II

| Pt/Ir Ratio (3 g/liter) | Initial Maximum NOx Reduction Ratio (%) (Before Aging) |
|---|---|
| 1:0 | 34.4 |
| 10:1 | 41.4 |
| 3:1 | 65.9 |
| 1:1 | 50.1 |
| 1:10 | 14.4 |
| 0:1 | 8.1 |

Figure 1:
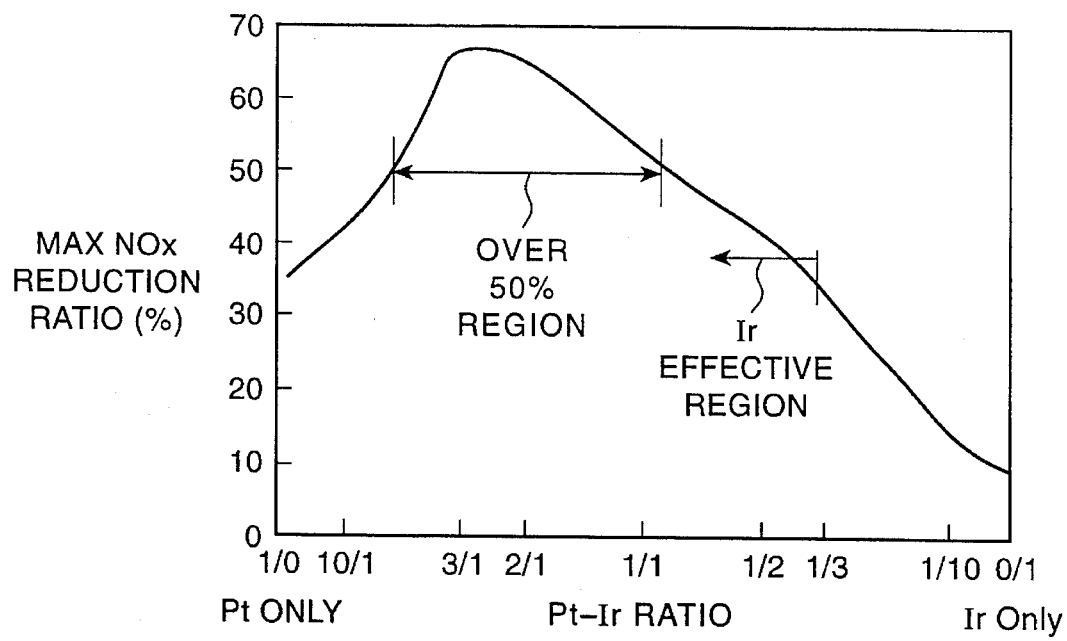
FIG. 1 is a graphical diagram showing nitrogen oxides (NOx) reduction rate relative to Pt—It ratio of a catalyst material according to a preferred embodiment of the present invention.

From a review of FIG. 1, it is recognized that Pt-to-Ir ratios are between 1:0 and 1:3 achieve maximum rates of nitrogen oxides (NOx) reduction higher than approximately 34%, which are considered to be effective and between 6:1 and 1:1 for maximum rates of nitrogen oxides (NOx) reduction higher than approximately 50%.

A test sample of a Pt—It $TiO_2$ catalyst material "B" was prepared by only replacing the Na-type ZSM-5 of the catalyst material "A" with titanium dioxide ($TiO_2$) as a carrier material.

Further, a Na-type ZSM-5 catalyst material "C" was prepared, which contained 1.8 cc of a solution of 4.562 weight % of rhodium nitride (RhNO) (Rh: 0.09 g) in addition to 0.4852 g of divalent platinum amine (Pt: 57.7% or 0.28 g) and 0.1392 of iridium trichloride ($IrCl_3$) (Ir: 64.7% or 0.09 g), as an additive catalyst substance. In the same manner as to the Na-type ZSM-5 catalyst material "A," the Pt—Ir—Rh Na-type ZSM-5 catalyst material "C" and its test sample were prepared.

For a comparative study, comparative catalyst materials "1," "2," "3" and "4" was provided. A comparative Pt Na-type ZSM-5 catalyst material "1," contained 0.4852 g of divalent platinum amine (Pt: 0.28 g) per 15 g of Na-type ZSM-5 powder carrier material. A comparative Pt Na-type ZSM-5 catalyst material "2" was similar to the comparative catalyst material "1" but contained divalent platinum amine not 0.4852 g but 0.216 g (Pt: 0.12 g) per 15 g of Na-type ZSM-5 powder carrier material. A comparative Ir Na-type ZSM-5 catalyst material "3" contained 0.186 g of iridium chloride ($IrCl_3$) (It: 0.12 g) only, as catalyst substance, in place of divalent platinum amine, per 15 g of Na-type ZSM-5 powder carrier material. A comparative Pt—Rh Na-type ZSM-5 catalyst material "4," contained 0.4852 g of divalent platinum amine (Pt: 0.28 g) and 1.8 cc of a solution of 4.562 weight % of rhodium nitride (RhNO) (Rh: 0.09 g) per 15 g of Na-type ZSM-5 powder carrier material. All of the comparative catalyst materials "1," "2," "3" and "4," and their test samples were prepared in the same manner as to the catalyst material "A" and its test sample.

Measurements were conducted for all of the test samples of the catalyst materials "A," "B" and "C" and the comparative catalyst materials "1," "2," "3" and "4" in the same manner as for the test sample of the catalyst material "A," to measure maximum rates of a nitrogen oxides (NOx) reduction before aging. The results are shown for the fresh test samples of the catalyst materials "A," "B" and "C" and the fresh test samples of the comparative catalyst materials "1," "2" and "4" in FIGS. 2 and 3, respectively.

Figure 2:
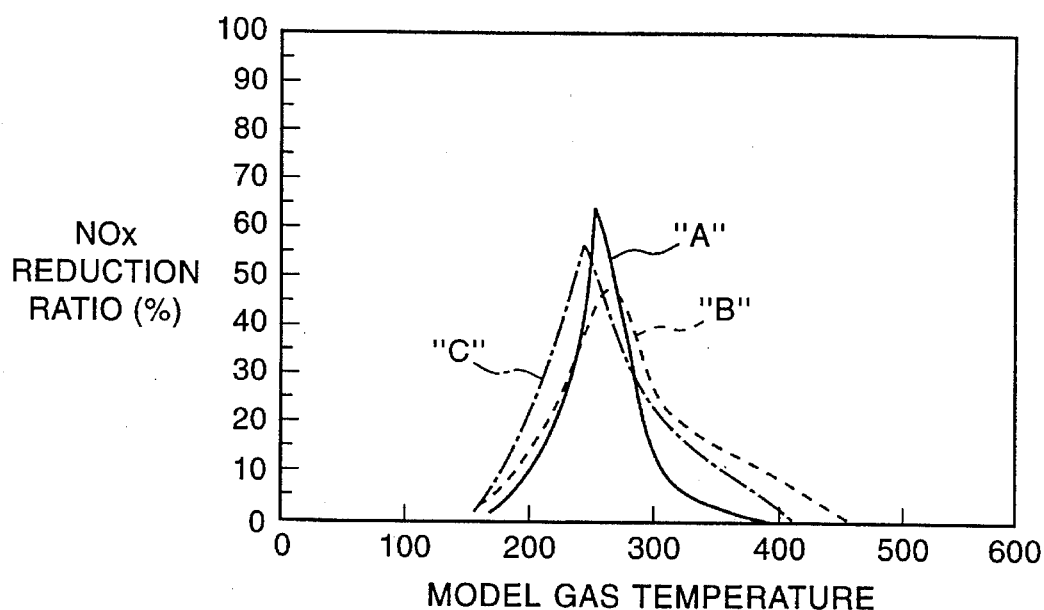
FIG. 2 is a graphical diagram showing nitrogen oxides (NOx) reduction rates, relative to exhaust gas temperature, of some samples of the catalyst material specified in FIG. 1.
Figure 3:
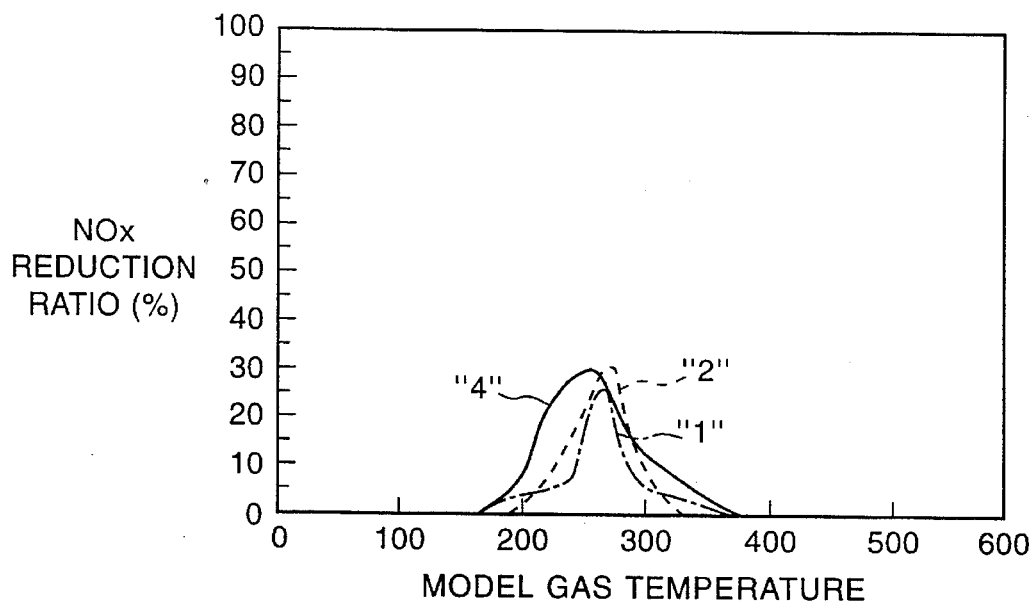
FIG. 3 is a graphical diagram showing nitrogen oxides (NOx) reduction rate, relative to exhaust gas temperature, of some comparative catalyst materials.

From the review of FIGS. 2 and 3, it is clearly recognized that the catalyst materials "A," "B" and "C," which carry or contain essentially platinum (Pt) and iridium (Ir) as a catalyst substance, cause a considerable increase in the rate of nitrogen oxides (NOx) reduction as compared with the comparative catalyst materials "1" and "2," which carry platinum (Pt) only as an catalyst substance and with the comparative catalyst material "4," which carries platinum (Pt) and rhodium (Rh) as an catalyst substance and that they exhibit good catalytic activity from lower temperatures. In particular, it is notable that the catalyst materials "A," "B" and "C" are surpassing in nitrogen oxides (NOx) reduction regardless of their carrier materials.

As understood from FIG. 3, the comparative catalyst material "3," which contain neither platinum (Pt) nor iridium (Ir) as a catalyst substance, exhibits the same level of nitrogen oxides (NOx) reduction as the comparative catalyst materials "1" and "2." This clearly indicates that the coexistence of platinum (Pt) and iridium (Ir) as a catalyst substance causes the catalyst materials "A," "B" and "C" to exhibit surpassing nitrogen oxides (NOx) reduction characteristics.

EMBODIMENT (EXAMPLE) II

In order to examine the exhaust purifying catalyst in accordance with another preferred embodiment of the invention, which carries at least one of III-B metals and IV-B metals together with platinum (Pt) as an catalyst substance, catalyst materials "D," "E" and "F" were provided. All of the catalyst materials "D," "E" and "F" made use of Na-type ZSM-5 (silicon-alum ratio 1:30) as a carrier material. The Pt—Sn Na-type ZSM-5 catalyst material "D" contained or carried 0.4852 g of divalent platinum amine (Pt: 57.7% or 0.28 g) as a platinum (Pt) catalyst substance and 0.1795 g of tin (I) acetate ($Sn(C_2H_3O_2)_2$) (Sn: 64.7% or 0.09 g), as a tin (Sn) catalyst substance, which was one of III-B or IV-B metals. These platinum (Pt) and tin (Sn) catalyst substances were dispersed first in water. Thereafter, the solution was mixed with 15 g of Na-type ZSM-5 powder carrier material. After the mixture was heated at 50 C being sufficiently agitated until it was dried and solidified. Then, the solid mixture was left in the air at 150 C for three hours and thereafter, baked at 500 C for two hours in the air. In this manner, a Pt—Sn Na-type ZSM-5 catalyst material "D" was prepared.

The Pt—Sn Na-type ZSM-5 catalyst material "D," which contained 3 g of Pt—Sn catalyst substance per one liter of catalyst, was coated to a codeweylite catalyst bed by wash coating to provide a test sample of the Pt—Sn Na-type ZSM-5 catalyst material "D". The test sample was further backed at 150° C. for three hours and then baked at 500 C for two hours.

Measurements were conducted for the test sample of the Pt—Sn Na-type ZSM-5 catalyst material "D" to measure maximum rates of a nitrogen oxides (NOx) reduction for various Pt-to-Sn ratios. The measurements were carried by the use of a stable gas pressure-stationary reactor. A model gas at a high concentration of oxygen, approximated to an exhaust gas generated when a lean fuel of an air-to-fuel ratio of approximately 22 was burned, was passed at a space velocity (SV) of 55,000 $h^{-1}$ through the fresh test sample of the Pt—Sn Na-type ZSM-5 catalytic material "D" to measure the maximum rate of nitrogen oxides (NOx) reduction. The results are shown in FIG. 4.

Figure 4:
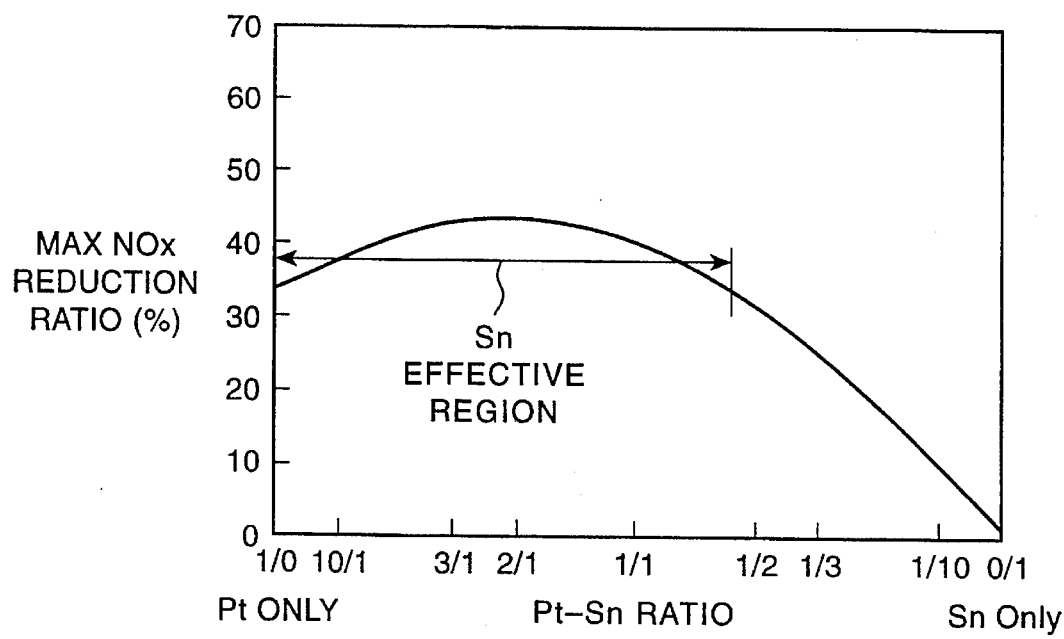
FIG. 4 is a graphical diagram showing nitrogen oxides (NOx) reduction rate relative to Pt-Sn ratio of a catalyst material according to another preferred embodiment of the present invention.

From a review of FIG. 4, it is recognized that Pt-to-Sn ratios are between 1:0 and 1:2 for maximum rates of nitrogen oxides (NOx) reduction higher than approximately 34% which are considered to be effective, and between 4:1 and 1:1 for greater maximum rates of nitrogen oxides (NOx) reduction.

The Pt—In Na-type ZSM-5 catalyst material "E" was prepared by replacing tin (I) acetate ($Sn(C_2H_3O_2)_2$) of the Pt—Sn Na-type ZSM-5 catalyst material "D" with 0.278 g of indium nitrate ($InNO_3$) (In: 0.09 g) as an indium (In) catalyst substance. The Pt—Ga Na-type ZSM-5 catalyst material "F" was prepared by replacing indium nitrate ($InNO_3$) of the Pt—In Na-type ZSM-5 catalyst material "E" with gallium nitrate ($GaNO_3$) (Ga: 0.09 g) as a gallium (Ga) catalyst substance. In the same manner as the Pt—Sn Na-type ZSM-5 catalyst material "D," the Pt—In Na-type ZSM-5 catalyst material "E" and Pt—Ir—Ga catalyst substance carrying Na-type ZSM-5 catalyst "F" are prepared. The catalyst materials "E" and "F" and their test samples were produced in the same manner as to the catalyst material "D" and its test sample.

Further, comparative catalyst materials "5" and "6" were provided. A comparative Sn Na-type ZSM-5 catalyst material "5" was prepared by removing divalent platinum amine from the catalyst material "D" i.e. by mixing 0.239 g of tin (I) acetate ($Sn(C_2O_3O_2)_2$) (Sn: 0.12 g) only per 15 g of Na-type ZSM-5 powder carrier material. A comparative In Na-type ZSM-5 catalyst material "5" was prepared by removing divalent platinum amine from the catalyst material "E" i.e. by mixing 0.371 g of indium nitrate ($InNO_3$) only per 15 g of Na-type ZSM-5 powder carrier material. The comparative catalyst materials "5" and "6" and their test samples were produced in the same manner as to the catalyst material "D" and its test sample.

All of the fresh test samples of the catalyst materials "D," "E" and "F" and the fresh test samples of the comparative catalyst materials "5" and "6" were tested in the same manner as for the test samples of the catalyst materials "A," "B" and "C" described above. The resultant rates of nitrogen oxides (NOx) reduction are shown in FIG. 5 for the catalyst materials "D" "E" and "F." However, the comparative catalyst materials "5" and "6" exhibited rates of nitrogen oxides (NOx) reduction lower than 10% which are less than those of the comparative catalyst materials "5" and accordingly, are not shown.

Figure 5:
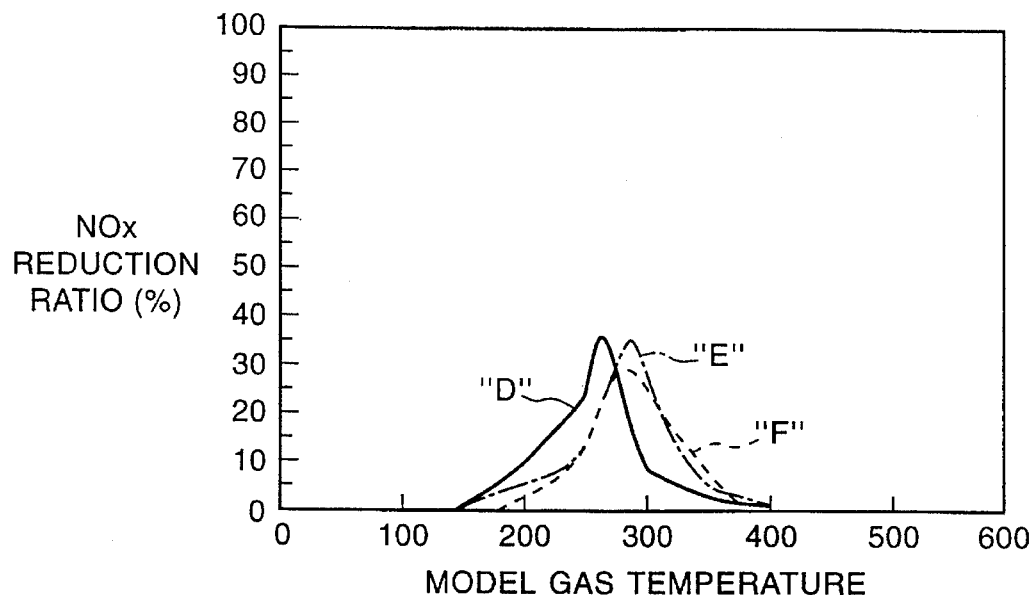
FIG. 5 is a graphical diagram showing nitrogen oxides (NOx) reduction rate, relative to exhaust gas temperature, of some other samples of the catalyst material specified in FIG. 4.

From the review of FIG. 5 in conjunction with FIG. 3, which shows the rates of nitrogen oxides (NOx) reduction for the comparative catalyst materials "1," "2" and "4," it is clearly noticeable that the catalyst materials "D," "E" and "F," exhibit almost the same active range of temperatures as the comparative catalyst material "4" which contains a rhodium (Rh) catalyst substance. This proves that the use of one of III-B metals and IV-B metals, which are very cheap as compared with noble metals such as platinum (Pt) and rhodium (Rh), allows the catalyst materials "D," "E" and "F" to be produced with effects comparable to noble metal contained catalyst materials at lower costs.

Figure 6:
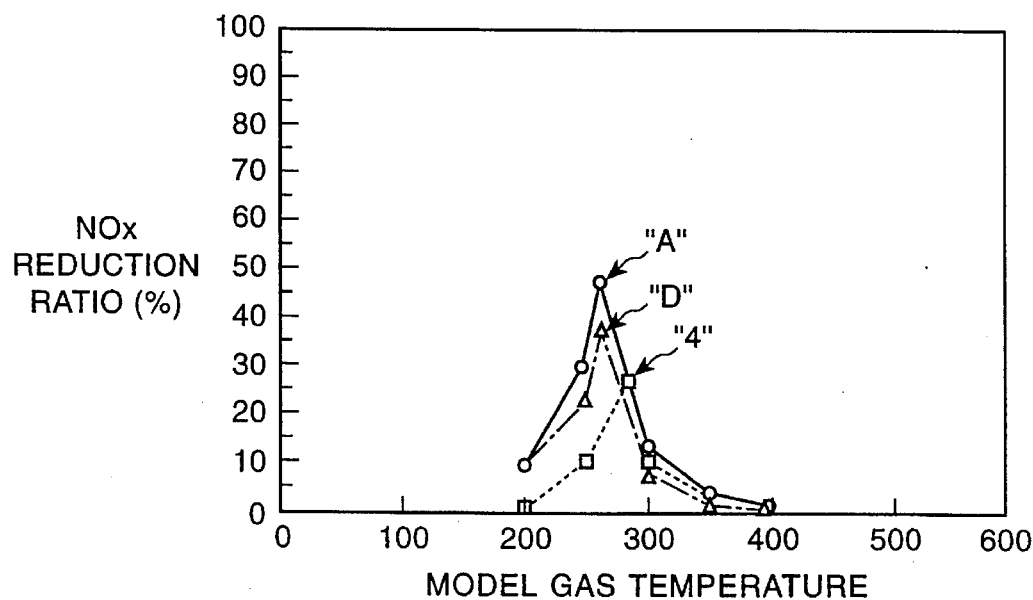
FIG. 6 is a graphical diagram showing nitrogen oxides (NOx) reduction rate, relative to exhaust gas temperature, of some of the samples of the catalyst material and comparative catalyst material for comparative study.

From the review of FIG. 6 which shows the rates of nitrogen oxides (NOx) reduction for the catalyst materials "A" and "D" and the comparative catalyst material "4," it is apparent that the catalyst materials containing, as catalyst substances, platinum (Pt) and Iridium (Ir) or tin (Sn), have the nitrogen oxides (NOx) reduction characteristic more active even at lower temperatures than the catalyst material containing, as catalyst substances, platinum (Pt) and rhodium (Rh).

EMBODIMENT III

A Pt—Ir—Rh Na type ZSM-5 catalyst material "G" in accordance with still another preferred embodiment of the present invention was provided, which contain, as catalyst substances, platinum (Pt), iridium (Ir) and rhodium (Rh) carried by a Na-type ZSM-5 carrier material. In order to examine an effective ratio of platinum (Pt), iridium (Ir) and rhodium (Rh) catalyst substances, the Pt—Ir—Rh Na-type ZSM-5 catalyst material "G" was prepared so as to contain 10:1:0.33 in weight percent of platinum (Pt), iridium (Ir) and rhodium (Rh) catalyst substances. Specifically, there were prepared an ion-exchange water solution of 0.5511 g of divalent platinum amine (Pt: 57.7% or 0.318 g) as a platinum (Pt) catalyst substance, 0.04941 g of iridium trichloride ($IrCl_3$) dispersed in ethanol as an iridium (Ir) catalyst substance, and 0.2107 cc of ion-exchange water solution of rhodium nitride (RhNO) as a rhodium (Rh) catalyst substance. These platinum (Pt), iridium (Ir) and rhodium (Rh) catalyst substances were mixed with 15 g of the Na-type ZSM-5 carrier material so as to produce one liter of a catalyst containing 3 g in total weight of a catalyst substance, and then heated and agitated at 60° C. until it was dried and solidified. Then, the solid mixture was left in the air at 150° C. for two hours.

A test sample of the Pt—Ir—Rh Na-type ZSM-5 catalyst material "G" was prepared by wash-coating the Pt—Ir—Rh Na-type ZSM-5 catalyst material "G" on a codeweylite catalyst bed in a well known manner, in which hydrated aluminum was used as catalyst binder, and thereafter, it was dried at 150 C for two hours and then backed at 500° C. for two hours.

In the same manner, other Pt—Ir—Rh Na-type ZSM-5 catalyst materials "H" to "Q" and comparative Pt—Ir—Rh Na-type ZSM-5 catalyst materials "7" to "15" were prepared for different proportions of platinum (Pt), iridium (Ir) and rhodium (Rh) catalyst substances as shown in Table III. The total weight of these catalyst substances is 3 g per one liter of a catalyst. All these catalyst materials and comparative catalyst materials were prepared in the same manner as the catalyst material "G."

TABLE III

|  |  | Pt—Ir—Rh Ratio | | | Catalyst Substance per 15 g Carrier Material | | |
|---|---|---|---|---|---|---|---|
|  |  | Pt | Ir | Rh | Pt (g) | Ir (g) | Rh (cc) |
| Example | G | 10 | 1 | 0.33 | 0.5511 | 0.04941 | 0.2107 |
| Catal- | H | 10 | 1 | 1 | 0.51 | 0.048 | 0.2107 |
| yst | I | 10 | 1 | 2.5 | 0.4575 | 0.04101 | 1.3482 |
|  | J | 10 | 1 | 5 | 0.39 | 0.0351 | 2.257 |
|  | K | 10 | 2 | 0.33 | 0.5055 | 0.0909 | 0.1926 |
|  | L | 10 | 2 | 1 | 0.48 | 0.0861 | 0.5562 |
|  | M | 10 | 3.3 | 0.17 | 0.4617 | 0.13794 | 0.0891 |
|  | N | 10 | 3.3 | 2.5 | 0.3942 | 0.11781 | 1.1412 |
|  | P | 10 | 5 | 3.3 | 0.4071 | 0.1823 | 0.1565 |
|  | Q | 10 | 10 | 1 | 0.2973 | 0.2664 | 0.3443 |
| Compar- | 7 | 10 | 0 | 1 | 0.5679 | 0 | 0.6561 |
| ative | 8 | 10 | 0 | 2.5 | 0.4992 | 0 | 1.4445 |
| Catal- | 9 | 1 | 0 | 0 | 0.2156 | 0 | 0 |
| yst | 10 | 10 | 1 | 0 | 0.5668 | 0.0513 | 0 |
|  | 11 | 8 | 1 | 0 | 0.5536 | 0.0633 | 0 |
|  | 12 | 6 | 1 | 0 | 0.5339 | 0.0814 | 0 |
|  | 13 | 5 | 1 | 0 | 0.5199 | 0.135 | 0 |
|  | 14 | 3 | 1 | 0 | 0.468 | 0.1398 | 0 |
|  | 15 | 1 | 1 | 0 | 0.312 | 0.2796 | 0 |

Tests were conducted for all of the catalyst materials "G" to "Q" and the comparative catalyst materials "7" to "15" to examine maximum rates of nitrogen oxides (NOx) reduction before and after aging in the same manner as described before. The measurements were made increasing the temperature of model gas at the entrance of the catalyst bed 30° C. every minute until it reached 450° C. The results are shown in Table IV. In table IV, there are also shown deterioration rates in percentage (%) of nitrogen oxides (NOx) reduction rates before and after aging.

TABLE IV

| | | Max. NOx Cracking Rate | | | | |
|---|---|---|---|---|---|---|
| | | Before Aging | | | | |
| | | NOx | | After Aging | | |
| | | Reduction Rate (%) | Temp. (°C.) | NOx Reduction Rate (%) | Temp. (°C.) | Deterioration ate (%) |
| Test | G | 58.8 | 225 | 27.2 | 265 | 53. |
| Sample | H | 57.5 | 225 | 19.5 | 265 | 66.1 |
|  | I | 52.5 | 225 | 5.5 | 280 | 89.5 |
|  | J | 36.3 | 245 | 9.8 | 295 | 73.0 |
|  | K | 53.6 | 230 | 24.4 | 265 | 54.5 |
|  | L | 53.6 | 220 | 19.5 | 265 | 63.6 |
|  | M | 54.1 | 235 | 22.1 | 280 | 59.1 |
|  | N | 44.7 | 240 | 8.5 | 295 | 81.0 |
|  | P | 53.6 | 225 | 25.6 | 275 | 52.5 |
|  | Q | 44.2 | 240 | 19.5 | 275 | 55.9 |
| Com- | 7 | 54.7 | 225 | 20.2 | 260 | 63.1 |
| para- | 8 | 52.4 | 220 | 8.1 | 305 | 84.5 |

TABLE IV-continued

| | | Max. NOx Cracking Rate | | | | |
|---|---|---|---|---|---|---|
| | | Before Aging | | | | |
| | | NOx | | After Aging | | |
| | | Reduction Rate (%) | Temp. (°C.) | NOx Reduction Rate (%) | Temp. (°C.) | Deterioration ate (%) |
| tive | 9 | 34.4 | 250 | 13. | 285 | 62.2 |
| Test | 10 | 30 | 250 | 13.2 | 300 | 56 |
| Sample | 11 | 35 | 245 | 13.6 | 300 | 61.1 |
|  | 12 | 34 | 245 | 14.9 | 300 | 56.2 |
|  | 13 | 41.9 | 235 | 19.3 | 285 | 53.9 |
|  | 14 | 53.5 | 245 | 16.5 | 285 | 69.2 |
|  | 15 | 30.2 | 250 | 13.3 | 305 | 56 |

As understood from Table IV, the Pt—Ir—Rh Na type ZSM-5 catalyst materials "G" to "Q" not only exhibit surpassing initial nitrogen oxides (NOx) reduction activity as compared with any comparative catalyst material but also are conspicuous to hold practical nitrogen oxides (NOx) reduction activity even after aging. From the above discussions, it is apparent that the Pt—Ir—Rh Na-type ZSM-5 catalyst material positively act in a temperature range widened toward lower temperatures.

Although the Na type ZSM-5 carrier material used for the catalyst materials "G" through "Q" and the comparative catalyst materials "7" through "15" is of a silicon-alum ratio of 1:30, it may be of a silicon-alum ratio of 1:22.8 for the same result as shown in Table IV.

Next, relating to the Pt—Ir—Rh Na type ZSM-5 catalyst materials "G" to "Q" and "7" to "15," an evaluation study was conducted to determine a desirable ratio of platinum (Pt), iridium (Ir) and rhodium (Rh) catalyst substances with which the catalyst materials exhibit the most improved maximum nitrogen oxides (NOx) reduction rates before and after aging and the most improved deterioration rates.

Figure 7:
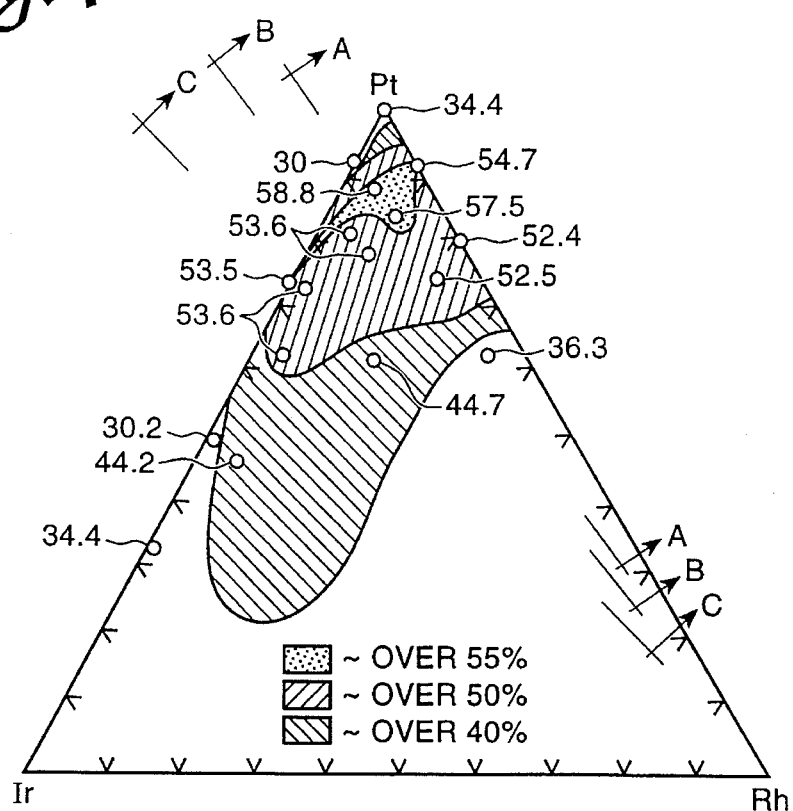
FIG. 7 is a graphical diagram in triangular co-ordinates showing a Pt—Ir—Rh ratio distribution, with respect to nitrogen oxides (NOx) reduction rate before aging, of a catalyst material prepared by an evaporating and solidification method according to another preferred embodiment of the present invention.
Figure 11:
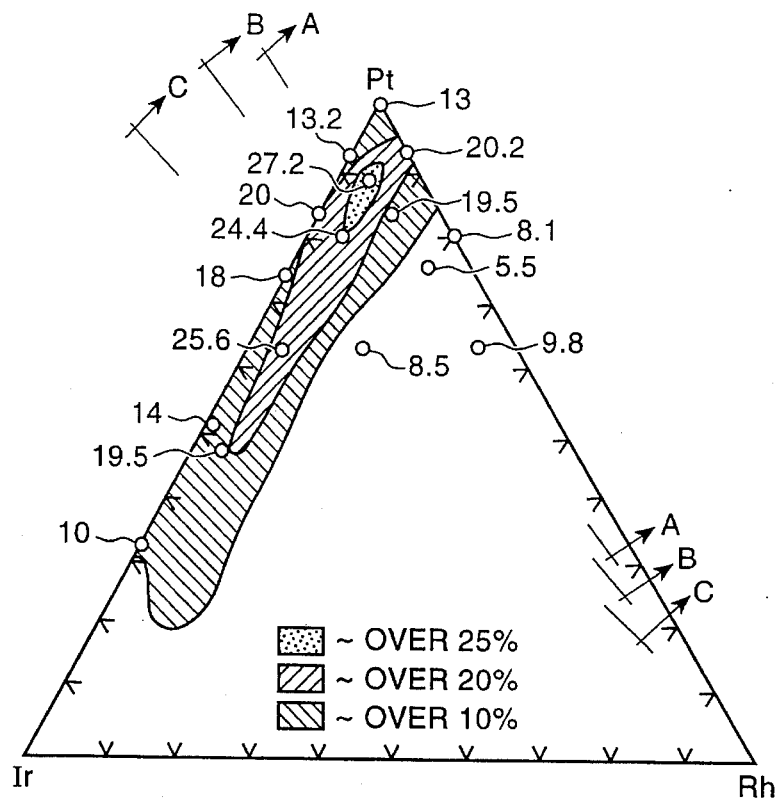
FIG. 11 is a graphical diagram in triangular co-ordinates showing a Pt—Ir—Rh ratio distribution, with respect to nitrogen oxides (NOx) reduction rate after aging, of a fresh catalyst material prepared by an evaporating and solidification method.
Figure 12:
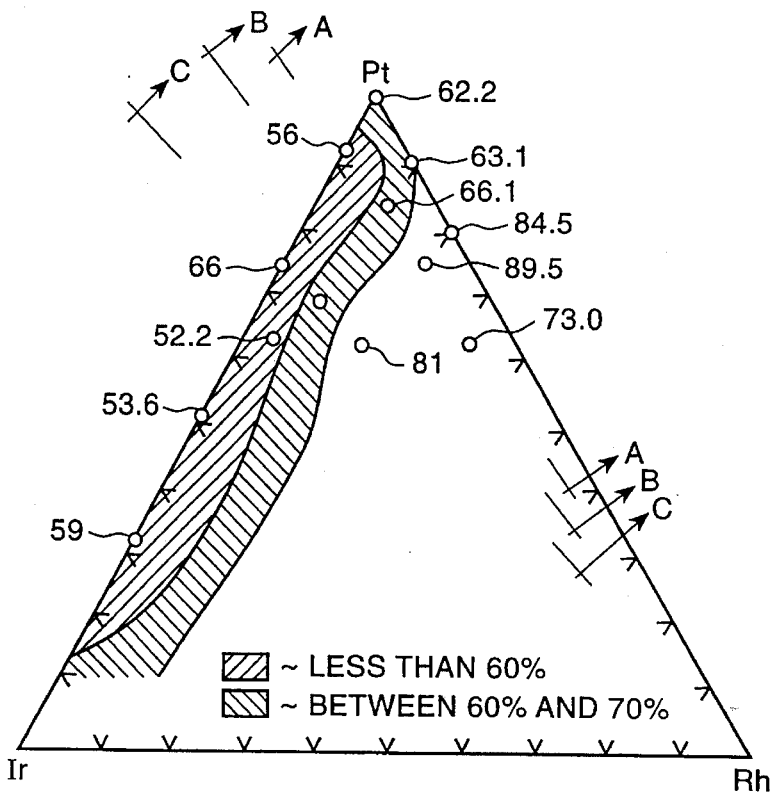
FIG. 12 is a graphical diagram in triangular co-ordinates showing the distribution of deterioration rate in nitrogen oxides (NOx) reduction rate, with respect to Pt—Ir—Rh ratio, of a catalyst material prepared by an evaporating and solidification method.

FIGS. 7, 11 and 12 illustrate triangular co-ordinates diagrams for evaluations which show distributions of maximum nitrogen oxides (NOx) reduction rates before and after aging relative to various ratios of Pt, Ir and Rh catalyst substances and of deterioration rates relative to various ratios of Pt, Ir and Rh catalyst substances for the Pt—Ir—Rh Na type ZSM-5 catalyst materials "G" through "Q" and "7" through "15."

Referring to FIG. 7, which shows a distribution of maximum nitrogen oxides (NOx) reduction rates before aging relative to various ratios of Pt—Ir—Rh catalyst substances of the Pt—Ir—Rh Na type ZSM-5 catalyst materials "G" through "Q" and "7" through "15," it is apparent that there are prominent distribution areas of nitrogen oxides (NOx) reduction rates, such as an activity area for nitrogen oxides (NOx) reduction rates between 40–50%, an activity area for nitrogen oxides (NOx) reduction rates between 50–55%, and a high activity area for nitrogen oxides (NOx) reduction rates higher than 55%. In the high activity area, there are surely included the Pt—Ir—Rh ratio of 10:1:0.33 of the catalyst material "G," which has been recognized on the basis of the inventor's investigations to be significantly surpassing in nitrogen oxides (NOx) reduction activity before aging and in heat resistance, and the Pt—Ir—Rh ratio 10:1:1 of the catalyst material "H" close to the ratio of 10:1:0.33.

Figure 8:
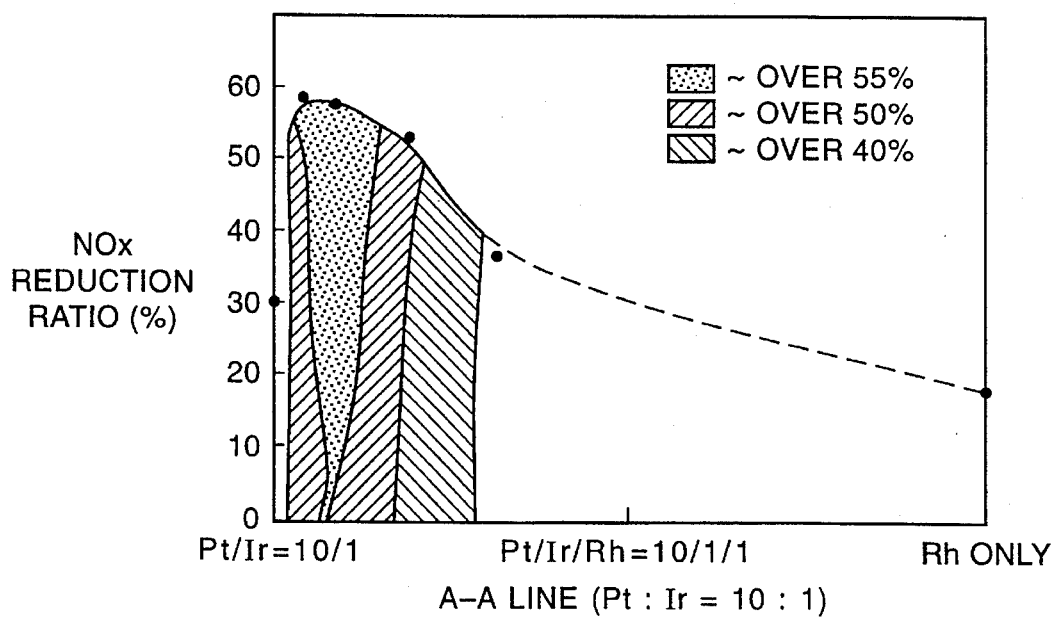
FIG. 8 is a graphical diagram showing maximum nitrogen oxides (NOx) reduction rates along line A—A in FIG. 7.
Figure 9:
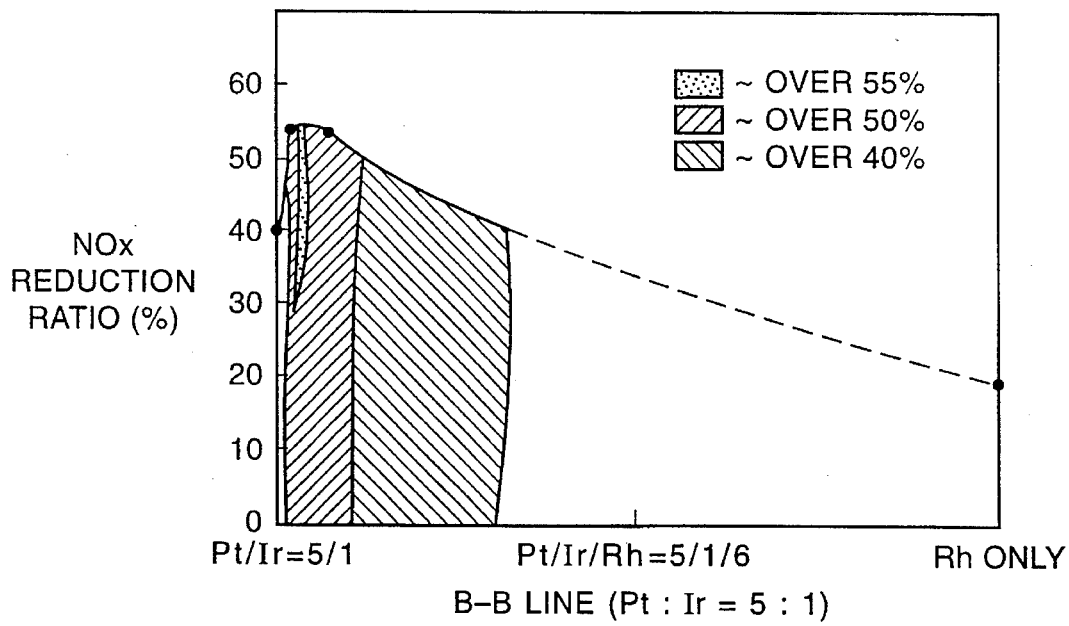
FIG. 9 is a graphical diagram showing maximum nitrogen oxides (NOx) reduction rates along line B—B in FIG. 7.
Figure 10:
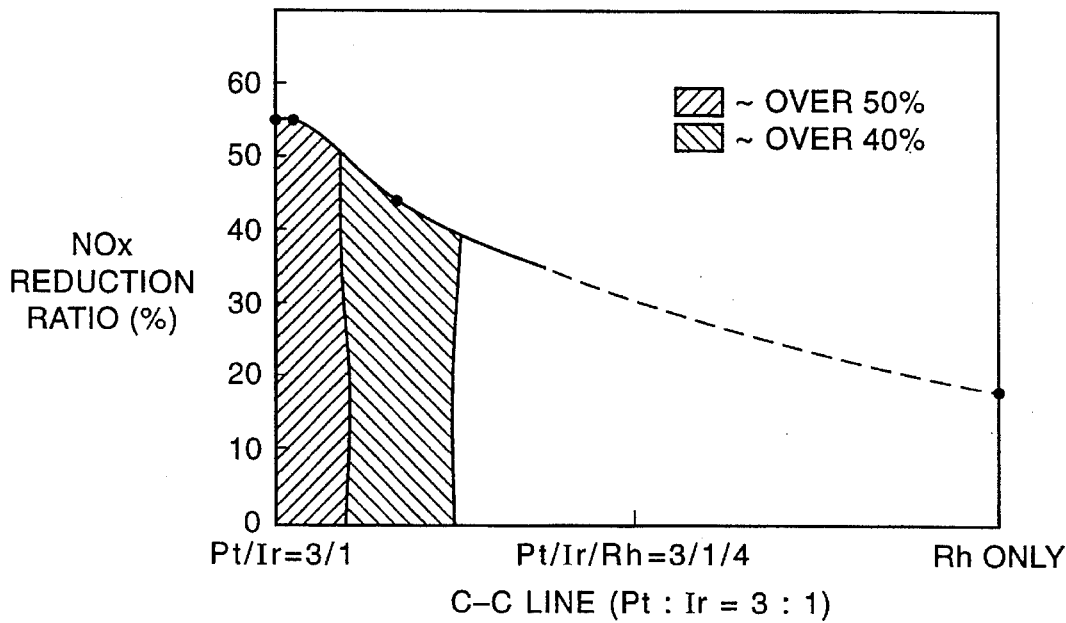
FIG. 10 is a graphical diagram showing maximum nitrogen oxides (NOx) reduction rates along line C—C in FIG. 7.

Relating to the distribution of maximum nitrogen oxides (NOx) reduction rates before aging relative to various Pt—Ir—Rh ratios illustrated in FIG. 7, changes in maximum nitrogen oxides (NOx) reduction rate according to quantitative contents of rhodium (Rh) are shown in FIGS. 8, 9 and 10 for Pt-to-Ir ratios of 10:1 (represented by A—A line); 5:1 (represented by B—B line); and 3:1 (represented by C—C line), respectively. From an review of FIGS. 9, 10 and 11, it is recognized that, in the high activity area, maximum nitrogen oxides (NOx) reduction rates of the Pt—Ir—Rh Na type ZSM-5 catalyst materials before aging are greatly and sensitively governed by rhodium (Rh) contents. Accordingly, Pt—Ir—Rh ratios to which surpassing nitrogen oxides (NOx) reduction activity are attributive are within a thin area defined along Pt—Ir side of the triangular co-ordinates diagram shown in FIG. 7.

From a review of FIG. 11 illustrating the maximum nitrogen oxides (NOx) reduction rates after aging relative to various Pt—Ir—Rh ratios, it is also apparent that there are prominent distribution areas of nitrogen oxides (NOx) reduction rates: an activity area for nitrogen oxides (NOx) reduction rates between 10–20%; an activity area for nitrogen oxides (NOx) reduction rates between 20–25%; and a high activity area for nitrogen oxides (NOx) reduction rates higher than 25%. The Pt—Ir—Rh Na-type ZSM-5 catalyst material "G," which contains platinum (Pt), iridium (Ir) and rhodium (Rh) catalyst substances of which a content ratio is 10:1:0.33, holds a maximum nitrogen oxides (NOx) reduction rate higher than 25% even after aging. Further, the Pt—Ir—Rh Na-type ZSM-5 catalyst material "K," which contains platinum (Pt), iridium (Ir) and rhodium (Rh) catalyst substances of which a Pt—Ir—Rh content ratio is close to that of the Pt—Ir—Rh Na-type ZSM-5 catalyst material "G," also holds a high maximum nitrogen oxides (NOx) reduction rate even after aging.

From the above study, it is understood that, in order for the Pt—Ir—Rh Na-type ZSM-5 catalyst materials after aging to keep maximum nitrogen oxides (NOx) reduction rates higher than 20% which is practically essential to reduce nitrogen oxides (NOx), a three component catalyst substance is desired to contain of platinum (Pt) of 45–92 weight %, iridium (Ir) of less than 50 weight % and rhodium (Rh) of less than 15 weight %. It is also understood that the Pt—Ir—Rh Na type ZSM-5 catalyst materials are needed to contain, as a three component catalyst substance, platinum (Pt) of 80–90 weight %, iridium (Ir) of 7–15 weight % and rhodium (Rh) of 3–8 weight % for maximum nitrogen oxides (NOx) reduction rates higher than 25% after aging.

Referring to FIG. 12, which illustrates a distribution of deterioration rates in maximum nitrogen oxides (NOx) reduction rate after aging relative to various content ratios of platinum (Pt), iridium (Ir) and rhodium (Rh) catalyst substances for the Pt—Ir—Rh Na-type ZSM-5 catalyst materials, it is apparent that there are prominent distribution areas of deterioration rates: an area for deterioration rates between 60–70% and an area for deterioration rates less than 60%. It is also understood that Pt—Ir—Rh content ratios, which provides the Pt—Ir—Rh Na-type ZSM-5 catalyst materials with maximum nitrogen oxides (NOx) purifying rates higher than 20% after aging, which is practically effective, are intensively included within the two prominent distribution areas.

Then, when reviewing FIGS. 11 and 12 which, respectively, show the distribution of maximum nitrogen oxides (NOx) reduction rates after aging and the distribution of deterioration rates in maximum nitrogen oxides (NOx) reduction rate, it is understood that the heat-resistance property of the Pt—Ir—Rh Na-type ZSM-5 catalyst materials is greatly sensitive to the contents of rhodium (Rh) catalyst substance. That is, the maximum nitrogen oxides (NOx) reduction rates after aging and the deterioration rates in maximum nitrogen oxides (NOx) reduction rate for Pt—Ir ratios: 10:1 (represented by A—A line); 5:1 (represented by B—B line); and 3:1 (represented by C—C line); indicate that high heat-resistance is realized within very thin stratified areas along Pt—Ir sides of the triangular co-ordinates diagrams shown in FIGS. 11 and 12. From this fact, it is understood that the heat-resistance property of the Pt—Ir—Rh Na type ZSM-5 catalyst materials is sensitively governed by the quantitative ratio of rhodium (Rh) catalyst substance and is greatly improved by adding of a proper amount of rhodium (Rh) catalyst substance.

EMBODIMENT V

A catalyst in accordance with a preferred embodiment of the present invention contains, as a catalyst material, platinum (Pt), iridium (Ir) and rhodium (Rh) catalyst substances which are carried by spray drying. The spray drying is applied by a spray drying apparatus shown in FIG. 13.

Figure 13:
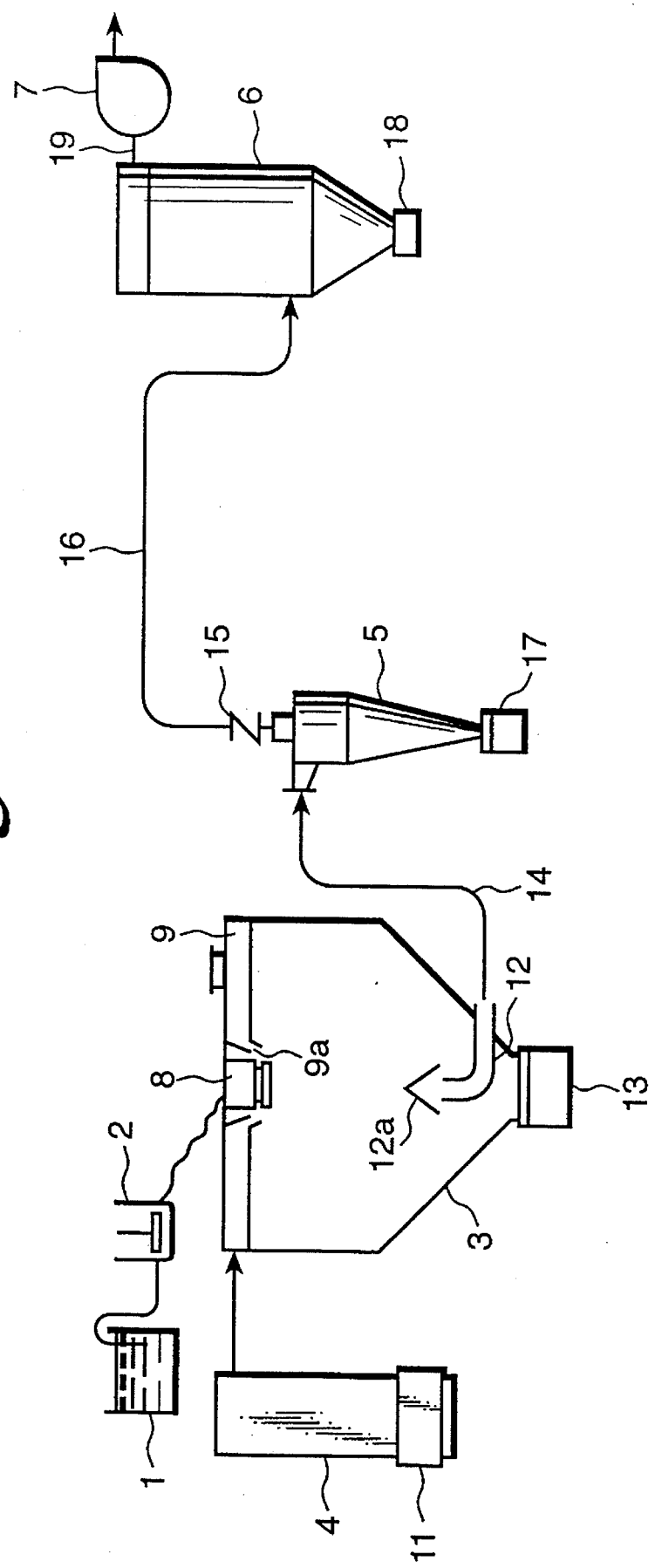
FIG. 13 is a schematic illustration showing a spray-drying apparatus.

Referring to FIG. 13, a bilateral type of spray drying apparatus includes a slurry tank 1, a tapered drying tank 3, a primary tapered cyclone 5 and a secondary tapered cyclone 6. The drying tank 3 is provided with a catalyst powder receiver 13 fitted to the bottom thereof. Similarly, the primary tapered tank 5 and the secondary tapered cyclone 6 are, respectively provided with catalyst powder receivers 17 and 18 fitted to bottoms thereof. The slurry tank 1 contains a catalyst material slurry of a solution of catalyst substances and catalyst carrier powder. the catalyst slurry is fed into an atomizer mill 8, located on the top of the drying tank 3, by means of a tube pump 2. On the top of the drying tank 3, there is provided or formed a hot blow chamber 9 with an opening 9a formed around the atomizer mill 8. An electric heater 4, inhaling air through an air filter 11 attached to the lower end thereof, heats the air and supplies hot air blow into the drying tank 3 via the hot blow chamber 9 through the opening 9a.

The drying tank 3 is provided with a discharger 12, having a cowl 12a above its top opening, located just above the catalyst powder receiver 13 fitted to the bottom thereof. The discharger 12 is communicated with the primary tapered cyclone 5 by means of a discharge pipe 14. Further, the primary tapered cyclone 5 is communicated with the secondary tapered cyclone 6 by means of a discharge pipe 16 via a blow regulating damper 15 provided between the primary tapered cyclone 5 and the discharge pipe 16. The secondary tapered cyclone 6 is provided with a discharge pipe 19 in which a discharge fan 7 is installed.

A catalyst material was produced by the use of the spray drying apparatus shown in FIG. 13. For preparing catalyst material slurry, divalent platinum amine crystal, iridium trichloride and rhodium nitride were prepared as catalyst substances and weighed so as to contain platinum (Pt), iridium (Ir) and rhodium (Rh) in a ratio of 30:3:1 in weight percent. The divalent platinum amine crystal and rhodium nitride were dissolved inion-exchange water, and the iridium trichloride was dispersed in ethanol. Then, these catalyst substances are mixed with each other, and H-type ZSM-5 (silicon-alum ratio 1:144) catalyst carrier powder was added to the mixture and agitated for two hours in the air.

Heat air blow was fed from the electric heater 4 into the drying tank 3 so as to maintain the interior of the drying tank 3 at 160° C. The catalyst material slurry in the slurry tank 1 was supplied by the tube pump 2 to the atomizer mill 8 and sprayed into the drying tank 3 by the atomizer mill 8 being driven at a nozzle speed of 8,000 rpm. Fine drops of the catalyst material contacted with heat air blow and were promptly dried in approximately five seconds to become particles. A part of dried particles of the catalyst material was collected in the catalyst powder receiver 13. On the other hand, suspended particles of the catalyst material were carried by the heat air blow into the primary cyclone 5 through the discharge pipe 14, where a part of the particles of the catalyst material was collected in the catalyst powder receiver 17. The particles of the catalyst material still suspended in the primary cyclone 5 were carried by the heat air blow into the secondary cyclone 6 through the discharge pipe 16, where the particles of the catalyst material was collected in the catalyst powder receiver 18.

The catalyst material powder, collected from the receivers 13, 17 and 18, was subjected to a heat treatment at 200° C. for 14 hours for activation so as thereby to provide a catalyst material "a." The catalyst material "a" was wash-coated on a codeweylite honeycomb bed with the use of hydrated aluminum binder so that the total weight of platinum (Pt), iridium (Ir) and rhodium (Rh) catalyst substances is 4.5 g per one liter of the catalyst material, and then dried and backed to provide a test sample of the catalyst material "a." In the same manner, test samples of catalyst materials "b" through "f," whose Pr—Ir—Rh ratios were different from one another as shown in Table V, were provided.

Measurements were conducted in the same conditions as for the previous measurements in order to measure maximum nitrogen oxides (NOx) reduction rates of the catalyst materials "a" through "f" before aging. The results of measurements are shown in Table V.

TABLE V

| | | Pt—Ir—Rh Ratio | | | Maximum NOx |
|---|---|---|---|---|---|
| | | Pt | Ir | Rh | Reduction Rate (%) |
| Catalyst | a | 10 | 1 | 0.33 | 52 |
| Material | b | 10 | 1 | 1 | 48 |
| | c | 10 | 2 | 0.33 | 61 |
| | d | 10 | 2 | 1 | 56 |
| | e | 10 | 3.3 | 3.33 | 51 |
| | f | 10 | 3.3 | 1 | 54 |

From the measurement result, it is presumed that Pt—Ir—Rh ratios of the Pt—Ir—Rh Na-type ZSM-5 catalyst materials, produced by the spray drying method, which exhibit practically high maximum nitrogen oxides (NOx) reduction rates before aging are possibly different from those of Pt—Ir—Rh Na-type ZSM-5 catalyst materials produced by the evaporating and solidifying method. In order to ascertain the authenticity of the presumption and find out a desirable range of Pt—Ir—Rh ratios, the resultant maximum nitrogen oxides (NOx) reduction rates are mapped out in a triangular co-ordinates diagram as shown in FIG. 14.

Figure 14:
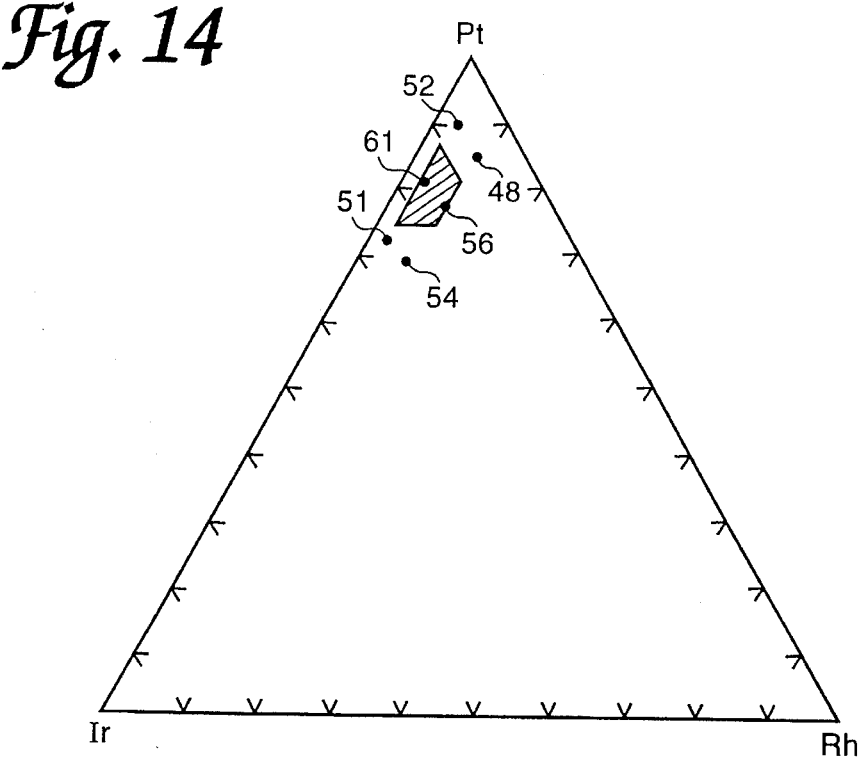
FIG. 14 is a graphical diagram in triangular co-ordinates showing a Pt—Ir—Rh ratio distribution, with respect to nitrogen oxides (NOx) reduction rate before aging, of a catalyst material prepared by an evaporating and solidification method.

When reviewing FIG. 14, it is understood that high nitrogen oxides (NOx) reduction rates are within a shaded area, which represents covers Pt—Ir—Rh catalyst materials containing platinum (Pt) of 47–86 weight %, iridium (Ir) of 11–23 weight % and rhodium (Rh) of 2.5–8 weight %.

Figure 15:
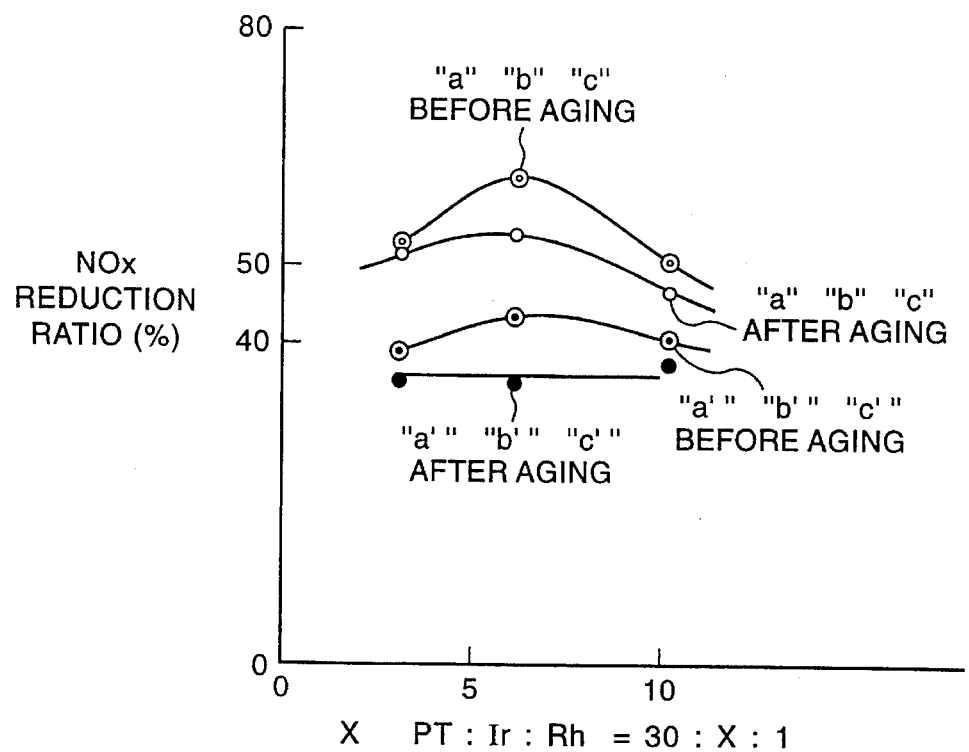
FIG. 15 is a graphical diagram showing nitrogen oxides (NOx) reduction rate relative to ratios of iridium (Ir) to platinum and rhodium (Pt—Rh) of a catalyst material prepared by the sprat-drying method.

The same measurements were conducted to measure nitrogen oxides (NOx) reduction rates for the catalyst materials "a," "c" and "e" and catalyst materials "a'," "c'" and "e'," which had not been subjected to any heat treatment. These catalyst materials had various ratios (X) of the iridium substance relative to a fixed Pt—Rh ratio of 30:1. The resultant nitrogen oxides (NOx) reduction rates are shown in FIG. 15. It is clearly observed that the catalyst materials "a," "c" and "e" exhibit nitrogen oxides (NOx) reduction rates higher than 40% even after aging and that the catalyst materials "a'," "c'" and "e'" exhibit nitrogen oxides (NOx) reduction rates after aging higher than the catalyst materials produced by the evaporating and solidifying method.

From the observation above, it is understood that the spray drying method allows catalyst materials to exhibit high nitrogen oxides (NOx) reduction rates before and after aging and that heat-treatment for activation causes an improvement in nitrogen oxides (NOx) reduction rates. This is considered that the catalyst substances is distributed uniformly in a carrier material, such as metal contained silicate, which is attributable to spray drying, that adsorbed water is broken away from the catalyst material, which is attributable to heat-treatment and by means of which an increase in nitrogen oxides (NOx) reduction and heat-resistance is caused, and that the catalyst substances are prevented from breaking away during wash-coating of the catalyst material.

Figure 16:
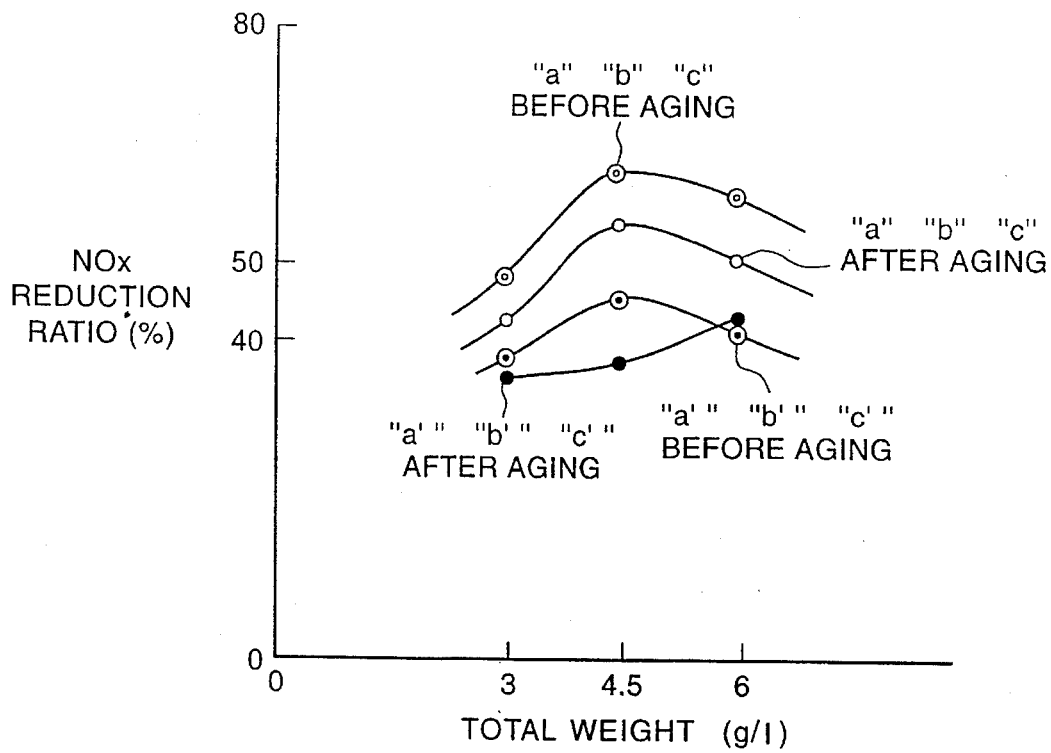
FIG. 16 is a graphical diagram showing nitrogen oxides (NOx) reduction rate relative to total quantity of catalyst substances.

Measurement was further conducted for the catalyst material "c," which had a Pt—Ir—Rh ratio of 30:6:1 and had exhibited the highest maximum nitrogen oxides (NOx) reduction rate, and the catalyst material "c'" to find out the most desirable total quantity of platinum (Pt), iridium (Ir) and rhodium (Rh) catalyst substances per one liter of catalyst. Catalyst materials were prepared so as to have different total quantities of platinum (Pt), iridium (Ir) and rhodium (Rh) catalyst substances per one liter of catalyst but to be indistinct in Pt—Ir—Rh ratio of 30:6:1, and were subjected to the measurement of maximum nitrogen oxides (NOx) reduction rates before and after aging under the same conditions as the above. The results are shown in FIG. 16. It is apparently understood from FIG. 16 that desirable total quantities of the platinum (Pt), iridium (Ir) and rhodium (Rh) catalyst substances are 3 to 6 g per one liter of catalyst substances.

Figure 17:
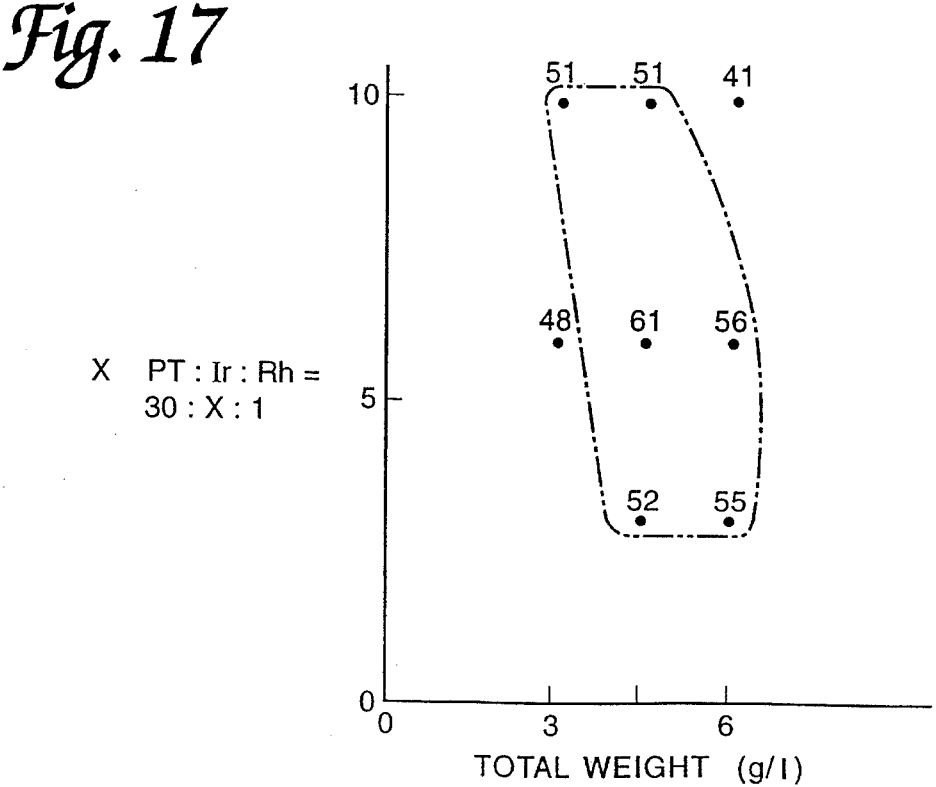
FIG. 17 is a graphical diagram showing nitrogen oxides (NOx) reduction rate relative to ratio of iridium (Ir) to platinum and rhodium (Pt—Rh) with respect to total quantity of platinum, iridium and rhodium (Pt—Ir—Rh)

In order to examine desirable total quantities of platinum (Pt), iridium (Ir) and rhodium (Rh) catalyst substances, to render the Pt—Ir—Rh catalyst materials favorable to exhibit the maximum nitrogen oxides (NOx) reduction rates before aging, measurements were conducted to Pt—Ir—Rh catalyst materials which had various total quantities of Pt—Ir—Rh catalyst substances and various ratios (X) of the iridium (Ir) substance relative to a fixed Pt—Rh substance ratio of 30:1. The result is shown in FIG. 17 in which a range of well acceptable maximum nitrogen oxides (NOx) reduction rates is defined by double-dotted line. When reviewing FIG. 17, it is understood that a favorable range of total quantities of Pt—Ir—Rh catalyst substances depends upon Pt—Ir—Rh ratios. That is, the total quantity of Pt—Ir—Rh catalyst substances is favorable, on one hand, to be smaller rather than larger when the ratio of iridium (Ir) catalyst substance relative to platinum (Pt) and rhodium (Rh) catalyst substances is high, and, on the other, to be larger rather than smaller when the ratio of iridium (Ir) catalyst substance relative to platinum (Pt) and rhodium (Rh) catalyst substances is low. It can be said either way that the favorable total quantity of Pt—Ir—Rh catalyst substances is 3.5 to 6 g per one liter of catalyst for Pt—Ir—Rh ratios are 74–86:11–23:2.5–8.

EMBODIMENT V

A catalyst material in accordance with another preferred embodiment of the present invention contains at least one of indium (In), cerium (Ce) and antimony (Sb), in addition to platinum (Pt), iridium (Ir) and rhodium (Rh), as a catalyst substance carried by a H type metal contained silicate.

For an evaluation study of nitrogen oxides (NOx) reduction rates relating to the Pt—Ir—Rh contained catalyst materials added with one of indium (In), cerium (Ce) and antimony (Sb), a standard catalyst material "R" was prepared so that 3 g of total weight of platinum (Pt), iridium (Ir) and rhodium (Rh) catalyst substances, whose content ratio is 10:1:0.33, per one liter of catalyst. Further, various catalyst materials "T," "U," "V," "W" and "X," such as shown in Table VI, were prepared by adding one of indium (In), cerium (Ce) and antimony (Sb) in different ratios. All of the catalyst materials use 15 g of an H-type metal contained silicate material (silicon-alum ratio 1:144). The catalyst materials "R" through "X" and their test samples were provided in the same manner as the previous ones.

TABLE VI

| Catalyst | | Content | | | | |
|---|---|---|---|---|---|---|
| Sample | Substance | Pt | Ir | Rh | In | Ce | Sb |
| R | | 10 | 1 | 0.33 | | | |
| S | In | 10 | 1 | 0.33 | 0.33 | | |
| T | Ce | 10 | 1 | 0.33 | | 0.33 | |
| U | Sb | 10 | 1 | 0.33 | | | 0.33 |
| V | In—Ce | 10 | 1 | 0.33 | 0.16 | 0.16 | |
| W | In | 10 | 1 | 0.33 | 0.66 | | |
| X | In | 10 | 1 | 0.33 | 0.99 | | |

For an evaluation of maximum nitrogen oxides (NOx) reduction rates, the respective test samples of the catalyst materials "R" to "X" were measured to obtain maximum nitrogen oxides (NOx) reduction rates before and after aging. The resultant maximum nitrogen oxides (NOx) reduction rates and deterioration rates are shown in Table VII.

TABLE VII

| | Max. NOx Reduction Rate (%) | | Deterioration |
|---|---|---|---|
| Sample | Fresh | Aged | Rate |
| R | 71.1 | 45.1 | 36.3 |
| S | 64.3 | 47.1 | 26.6 |
| T | 60.7 | 48.2 | 20.6 |
| U | 60.9 | 46.6 | 23.5 |
| V | 66.7 | 45.9 | 31.2 |
| W | 61.0 | 44.6 | 26.9 |
| X | 59.7 | 39.5 | 33.8 |

From the Table VII, it is clearly recognized that the H-type metal contained catalyst materials, which contain at least one of In, Ce and Cb catalyst substances in addition to platinum (Pt), iridium (Ir) and rhodium (Rh), are:

(1) the additive catalyst substances, such as indium (In), cerium (Ce) and antimony (Sb), are almost equally improved nitrogen oxides (NOx) reduction rate after aging;

(2) the combinations of additive catalyst substances, such as indium (In) and cerium (Ce), causes almost equally improvement in nitrogen oxides (NOx) reduction rate relative to the single additive catalyst substance; and (3) any one of or any combination of indium (In) and cerium (Ce) catalyst substances to be added has quantitative limits in addition and if they are added in excess beyond the limits, they are adversely affected.

In order to examine a proper volume of an additive catalyst substance, such as indium (In), cerium (Ce) and tin (Sb), relative to the volume of rhodium (Rh) catalyst substance, measurement were conducted to detect maximum nitrogen oxides (NOx) reduction rates before and after aging for various In—Rh ratios. The result is shown in FIG. 18.

Figure 18:
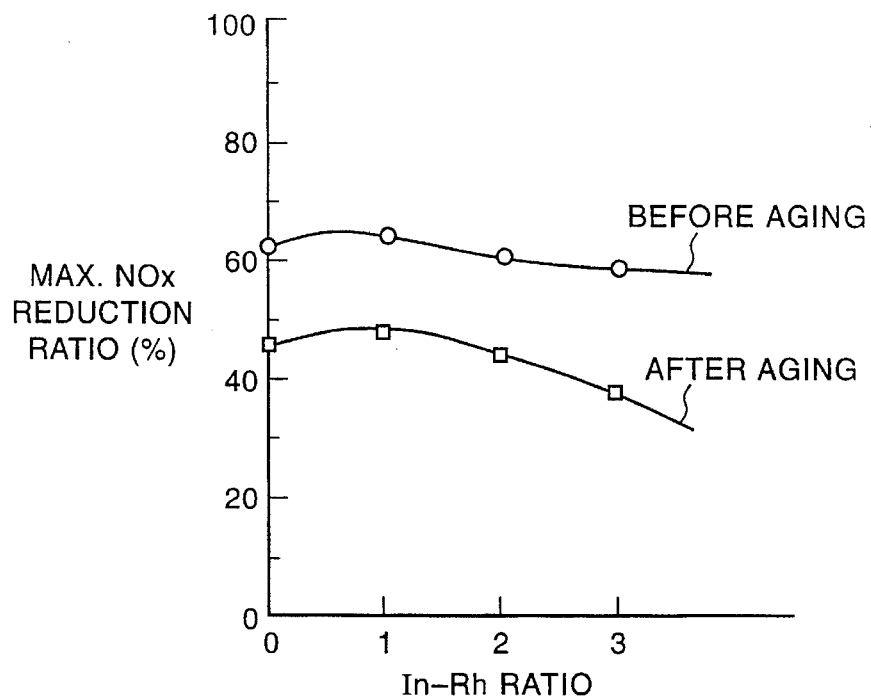
FIG. 18 is a graphical diagram showing maximum nitrogen oxides (NOx) reduction rate, relative to ratio of indium (In) to rhodium (Rh) of a catalyst material in accordance with a further preferred embodiment of the present invention.

From a review of FIG. 18, it is understood that In—Rh ratios which play an important role in preventing a steep decrease in maximum nitrogen oxides (NOx) reduction rate after aging are between 0.5:1 and 2.0:1. When rating the result taking account that the use of any two additive catalyst substances of In, Ce and Sb gives almost the same effect as the use of a single additive catalyst substance and that some combination of additive catalyst substances possibly decrease the maximum nitrogen oxides (NOx) reduction rate before aging, it can be said that a desirable weight ratio of a single additive catalyst substance or a combination of additive catalyst substances relative to Pt—Ir—Rh catalyst substances is between 0.5:5.0 and, desirably between 0.5:1.5.

EMBODIMENT VI

A catalyst material in accordance with another preferred embodiment of the present invention is improved the dispersion of catalyst substances to which the dependency of nitrogen oxides (NOx) reduction rate to exhaust gas space velocity is attributable. A catalyst material contains platinum (Pt) and iridium (Ir) catalyst substances, which are partly carried by a catalyst carrier material, such as Na-type ZSM-5 (silicon-alum ratio 1:30) and are partly dispersed in hydrated aluminum binder by means of which the catalyst material is coated on a catalyst bed.

For evaluation of the dependency of nitrogen oxides (NOx) reduction rate to exhaust gas space velocity, in order to provide a catalyst material which contain 0.1617 g of divalent platinum amine crystal and 0.0466 g of iridium trichloride ($IrCl_3$), as catalyst materials per 5 g of Na type ZSM-5 catalyst carrier material, on one hand, a catalyst material contains 90% of the catalyst materials, namely 0.14553 g of divalent platinum amine crystal and 0.0419 g of iridium trichloride ($IrCl_3$), were mixed with 5 g of Na-type ZSM-5 catalyst carrier material. On the other hand, another part, namely 10%, of the catalyst materials, namely 0.01617 g of divalent platinum amine crystal and 0.00466 g of iridium trichloride ($IrCl_3$), were mixed with 1 g of hydrated aluminum binder, which was necessary for 5 g of Na-type ZSM-5 catalyst carrier material. A test sample was prepared, as a catalyst converter, by coating the catalyst material on a catalyst bed by the use of the binder. For comparative study, a comparative catalyst material was prepared so as to contain the whole quantity of catalyst substances in the catalyst carrier material. The comparative catalyst material was prepared, as a comparative catalyst converter, by being coated to a catalyst bed by the use of a binder with no catalyst material contained.

The test samples of the catalyst material and comparative catalyst material was subjected to measurements of nitrogen oxides (NOx) reduction rates for evaluation of the dependency to gas velocity.

This measurement was made at model gas space velocities (SV) of 25,000 $h^{-1}$ 55,000 $h^{-1}$ 89,000 $h^{-1}$ and 144,000 $h^{-1}$ in such a way that a model gas, which was equivalent to an exhaust gas generated when a lean fuel at an air-to-fuel ratio of approximately 22 was burned, was maintained at 250° C. at the entrance of the catalyst bed. The resultant nitrogen oxides (NOx) reduction rates are shown in FIG. 19.

Figure 19:
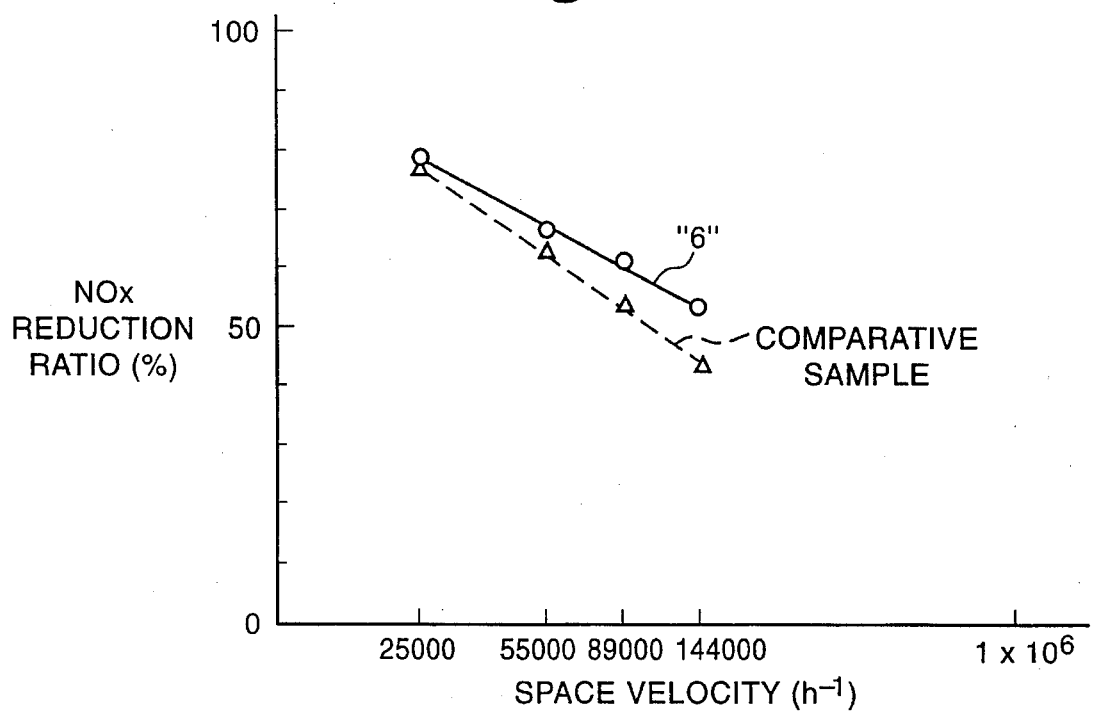
FIG. 19 is a graphical diagram showing nitrogen oxides (NOx) reduction rate of a catalyst material relative to gas space velocity.

From a review of FIG. 19, it is understood that the test sample of the catalyst material is improved in nitrogen oxides (NOx) reduction rate approximately 10 to 20% as compared with the test sample of the comparative catalyst material and that the test sample of the catalyst material provides nitrogen oxides (NOx) reduction rates at model gas space velocities which are approximately 50 to 60% higher than those at which the test sample of the comparative catalyst material provides indistinctive levels of nitrogen oxides (NOx) reduction rates.

This fact indicates that the dependency of nitrogen oxides (NOx) reduction rate to exhaust gas velocities of the catalyst material has been greatly improved as compared with the comparative catalyst material, especially, in a range of higher gas space velocities. This improvement of the dependency of nitrogen oxides (NOx) reduction rate to gas velocity is securely obtained with a catalyst material in which at least a part of catalyst materials including at least platinum (Pt) and iridium (Ir) catalyst substances is carried by a binder. It is true for Pt—Ir—Rh catalyst materials in which at least a part of catalyst materials including at least platinum (Pt) and iridium (Ir) catalyst substances at least a part of Pt—Ir—Rh catalyst substances is carried by a binder.

It is also to be understood that although the present invention has been described in detail with respect to preferred embodiments thereof, various other embodiments and variants may occur to those skilled in the art. Such other embodiments and variants hall within the scope and spirit of the invention and are intended to be covered by the following claims.

What is claimed is:

1. An engine exhaust purifying catalyst comprising:
   a catalytic material including, as active substances, platinum (Pt), iridium (Ir) and rhodium (Rh); and
   a catalyst carrier by which said catalytic material is carried;
   proportions of said active substances being 74 to 96%, 7 to 23% and 2.5 to 8% in weight, relative to the total weight of said active substances, for platinum (Pt), iridium (Ir) and rhodium (Rh), respectively.

2. An engine exhaust purifying catalyst as defined in claim 1, wherein said catalytic material is coated on said catalyst carrier of evaporation and drying.

3. An engine exhaust purifying catalyst as defined in claim 2, wherein proportions of said active substances are 80 to 90%, 7 to 15% and 3 to 8% in weight, relative to the total weight of said active substances, for platinum (Pt), iridium (Ir) and rhodium (Rh), respectively.

4. An engine exhaust purifying catalyst as defined in claim 1, wherein said catalytic material is coated on said catalyst carrier by spray drying.

5. An engine exhaust purifying catalyst as defined in claim 4, wherein proportions of said active substances are 74 to 86%, 11 to 23% and 2.5 to 8% in weight relative to the total weight of said active substances for platinum (Pt), iridium (Ir) and rhodium (Rh), respectively.

6. An engine exhaust purifying catalyst as defined in claim 1, wherein said catalytic material further includes, as an additional active substance, at least one of indium (In), cerium (Ce) and antimony (Sb).

7. An engine exhaust purifying catalyst as defined in claim 6, wherein a proportion of said additional active substance is 0.5 to 5% in weight relative to that of said rhodium (Rh).

8. An engine exhaust purifying catalyst as defined in claim 6, wherein a proportion of said addition active substance is 0.5 to 1.5% in weight relative to that of said rhodium.

9. An engine exhaust purifying catalyst as defined in claim 1, wherein said catalyst carrier comprises a metal containing silicate.

* * * * *